United States Patent
Takagi et al.

(10) Patent No.: US 9,609,185 B2
(45) Date of Patent: Mar. 28, 2017

(54) IMAGE CAPTURING APPARATUS

(71) Applicant: SONY CORPORATION, Tokyo (JP)

(72) Inventors: Noriaki Takagi, Kanagawa (JP); Yoshinori Yamada, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/657,229

(22) Filed: Mar. 13, 2015

(65) Prior Publication Data

US 2015/0281529 A1 Oct. 1, 2015

(30) Foreign Application Priority Data

Mar. 25, 2014 (JP) ................................ 2014-061620

(51) Int. Cl.
| | |
|---|---|
| *H04N 5/222* | (2006.01) |
| *H04N 5/225* | (2006.01) |
| *H04N 5/232* | (2006.01) |
| *G03B 17/04* | (2006.01) |

(52) U.S. Cl.
CPC ........... *H04N 5/2252* (2013.01); *G03B 17/04* (2013.01); *H04N 5/23293* (2013.01)

(58) Field of Classification Search
CPC .................................................. H04N 5/2252

USPC ............................ 348/374, 333.01; 715/810
See application file for complete search history.

(56) References Cited

U.S. PATENT DOCUMENTS

| | | | | |
|---|---|---|---|---|
| 8,654,238 | B2* | 2/2014 | Fujinawa | H04N 1/00442 348/333.01 |
| 9,007,511 | B2* | 4/2015 | Naito | G03B 13/36 348/333.06 |
| 2003/0071914 | A1* | 4/2003 | Wei | H04N 5/232 348/375 |
| 2007/0281749 | A1* | 12/2007 | Suga | H04M 1/021 455/566 |
| 2007/0285498 | A1* | 12/2007 | Shiomi | H04N 1/00347 348/14.02 |

FOREIGN PATENT DOCUMENTS

JP 2013-254007 A 12/2013

* cited by examiner

*Primary Examiner* — Joel Fosselman
(74) *Attorney, Agent, or Firm* — Chip Law Group

(57) ABSTRACT

There is provided an image capturing apparatus, comprising an image capturing device disposed inside of a housing; and a holding unit held by an image capturer upon an image capture, a first turning axis substantially orthogonal to an optical axis being disposed in the holding unit, a display unit on which an image captured by the image capturing device is displayed turning freely opened/closed to the housing centering around the first turning axis.

22 Claims, 22 Drawing Sheets

IMAGE CAPTURING APPARATUS

CROSS REFERENCE TO RELATED APPLICATIONS

This application claims the benefit of Japanese Priority Patent Application JP 2014-061620 filed Mar. 25, 2014, the entire contents of which are incorporated herein by reference.

BACKGROUND

The present technology relates to an image capturing apparatus having a display unit extendible to a housing.

In an image capturing apparatus, when an image is captured using a display unit, an image capturing area is confirmed, a focus is confirmed and a captured image is viewed. In such image capturing apparatuses, a large display unit is desirable in order to confirm and view easily.

In addition, in order to capture a self-image using an image capturing apparatus, the image capturing area and a focus are desirably confirmed from an object side. In order to correspond thereto, there is an image capturing apparatus having a display unit that turns approximately 180 degrees to a housing as shown in Japanese Patent Application Laid-open No. 2013-254007. In such image capturing apparatus, when the self-image is captured, the display unit turns 180 degrees to the housing to face the display unit to the object side, and the image capturing area and the focus are confirmed while confirming an own appearance displayed on the display unit.

SUMMARY

The image capturing apparatus having the display unit turning to the housing should have a turning mechanism. When the turning mechanism is disposed as a dedicated mechanism, a dedicated space for the turning mechanism is necessary, which may undesirably reduce the size of the display unit.

In view of the circumstances as described above, it is desirable that a turning mechanism for turning a display unit to a housing is disposed without growing a size of an image capturing apparatus and the display unit is enlarged.

According to an embodiment of the present technology, there is provided an image capturing apparatus including an image capturing device disposed inside of a housing; and a holding unit held by an image capturer upon an image capture, a first turning axis substantially orthogonal to an optical axis being disposed in the holding unit, a display unit on which an image captured by the image capturing device is displayed turning freely opened/closed to the housing centering around the first turning axis. The holding unit also acts as the turning mechanism, no dedicated mechanism for opening and closing the display unit is necessary.

In the image capturing apparatus according to the embodiment of the present technology, a lens or lens mount part may be disposed at a front surface of the housing, and a storing space for storing the display unit may be disposed at a rear surface positioned opposite to the front surface of the housing. The display unit can be stably held by the housing.

In the image capturing apparatus according to the embodiment of the present technology, a storing concave part for storing at least a part of the display unit may be formed in the storing space. A protrusion amount of the display unit from the housing can be decreased.

In the image capturing apparatus according to the embodiment of the present technology, a lens or lens mount part may be disposed at a front surface of the housing, and the holding unit may be positioned at a right side of the lens or the lens mount part when the housing is viewed from backwards by substantially aligning a short direction of the image capturing device with a gravity direction. When the image capturing apparatus is held by a right hand, the holding unit can be wrapped by a palm of the right hand.

In the image capturing apparatus according to the embodiment of the present technology, a lens or lens mount part may be disposed at a front surface of the housing, the holding unit may be positioned above of the lens or the lens mount part when the housing is viewed from an opposite direction of the lens or an opposite direction of the lens mount part by substantially aligning a longitudinal direction of the image capturing device with a gravity direction.

In the image capturing apparatus according to the embodiment of the present technology, an image capturing button is positioned at a right end or a left end of an upper end of the housing. When a self-image is captured, a thumb or an index finger for holding can push down the image capturing button.

In the image capturing apparatus according to the embodiment of the present technology, the first turning axis is substantially aligned with the short direction of the image capturing device. When an image is captured with the image capturing apparatus being vertically long, the display unit turns to the housing centering around the first turning axis, whereby the display unit can be positioned adjacent to a vertical direction of the housing.

In the image capturing apparatus according to the embodiment of the present technology, the display unit may have a base part connected to the housing unit and a display main unit supported by the base part freely turnable in an axis rotating direction of a second turning axis orthogonal to the first turning axis, and the display main unit may turn between a superimposed position where the display main unit is overlaid with the base part and an extended position where the display main unit is adjacent to the base part in an axial direction of the first turning axis. With the turning of the display main unit, the display unit faces different directions in the superimposed position and the extended position.

In the image capturing apparatus according to the embodiment of the present technology, the display main unit may be slidable to the base part between a first sliding position and a second sliding position in the superimposed position, turning of the display main unit to the base part may be restricted in the first sliding position, and turning of the display main unit to the base part may be possible in the second sliding position. Based on the sliding position to the base part, the display main unit is turnable or inturnable to the base part.

In the image capturing apparatus according to the embodiment of the present technology, a buttery for supplying electrical power to the display main unit may be detachable at the base part. With the base part to which a buttery is attached, electrical power is supplied from the buttery to the display main unit.

In the image capturing apparatus according to the embodiment of the present technology, the holding unit may turn centering around the first turning axis accompanied by opening and closing the display unit. No turning part may be disposed on the housing.

In the image capturing apparatus according to the embodiment of the present technology, the display unit may be detachable to the holding unit, and a connection terminal transmitting an image signal of the image capturing device to the display unit may be disposed. With the holding unit to which the display unit is attached, data can be passed and electrical power can be supplied between the display unit and the apparatus main body.

In the image capturing apparatus according to the embodiment of the present technology, the display unit may have a transmitting part, the housing may have a receiving part, and the transmitting part may be capable of transmitting a control signal relating to capturing to the receiving part while the display unit is detached from the holding unit. With the display unit being detached from the apparatus main body, the control signal transmitted from the transmitting part can be received by the receiving part.

In the image capturing apparatus according to the embodiment of the present technology, the display main unit may have a touch panel display. No manipulandum such as a button is necessary on the display unit.

In the image capturing apparatus according to the embodiment of the present technology, a thickness of the holding unit in an optical axis direction may be thicker than a thickness of the housing in an optical axis direction. Upon an image capture, the holding unit is fitted to a palm to assure a good holding status of the holding unit.

In the image capturing apparatus according to the embodiment of the present technology, a lens or lens mount part may be disposed at a front surface of the housing, the holding unit may bulge only at the front surface of the housing. Upon an image capture, the holding unit is fitted to a palm to assure a good holding status of the holding unit.

In the image capturing apparatus according to the embodiment of the present technology, the holding unit may have a cylindrical shape centering around the first turning axis. The holding unit has a simple shape.

An image capturing apparatus according to an embodiment of the present technology includes an image capturing device disposed inside of a housing, a holding unit held by an image capturer upon an image capture, and a display unit on which an image captured by the image capturing device is displayed, a first turning axis substantially orthogonal to an optical axis being disposed in the holding unit, and the display unit freely opened/closed to the housing centering around the first turning axis. The holding unit also acts as the turning mechanism, no dedicated mechanism for opening and closing the display unit is necessary.

According to the embodiments of the present technology, as there is provided the holding unit supported freely turnable centering around the first turning axis, the holding unit also acts as the turning mechanism. Therefore, the turning mechanism for turning the display unit to the housing is disposed without growing a size of the image capturing apparatus and the display unit is enlarged.

The above-described advantages are not necessarily limited and any of the advantages described in the present disclosure may be provided. These and other objects, features and advantages of the present technology will become more apparent in light of the following detailed description of best mode embodiments thereof, as illustrated in the accompanying drawings.

DETAILED DESCRIPTION OF EMBODIMENTS

Hereinafter, an embodiment of the present technology will be described with reference to the drawings.

The embodiments of the present technology will be described in the following order.
<1. Configuration of Image Capturing Apparatus>
<2. Operation of Image Capturing Apparatus>
[2-1. Turn centering around First Turning Axis]
[2-2. Turn centering around Second Turning Axis]
<3. Second Embodiment>
<4. Alternative Embodiment>
<5. Summary>
[Other Embodiments]

Present Technology

In the following description, a surface on which an image capturing button is disposed is taken as an upper surface in an image capturing apparatus. In this way, up and down thereof are represented. Unless otherwise noted, left and right, and back and forth are seen from an image capturer (display). In other words, the front is at an object side and the back is at an image capturer side. Note that these directions are for convenience in the following description and are not limited in the embodiment of the present disclosure.

<1. Configuration of Image Capturing Apparatus>

Figure 1A:
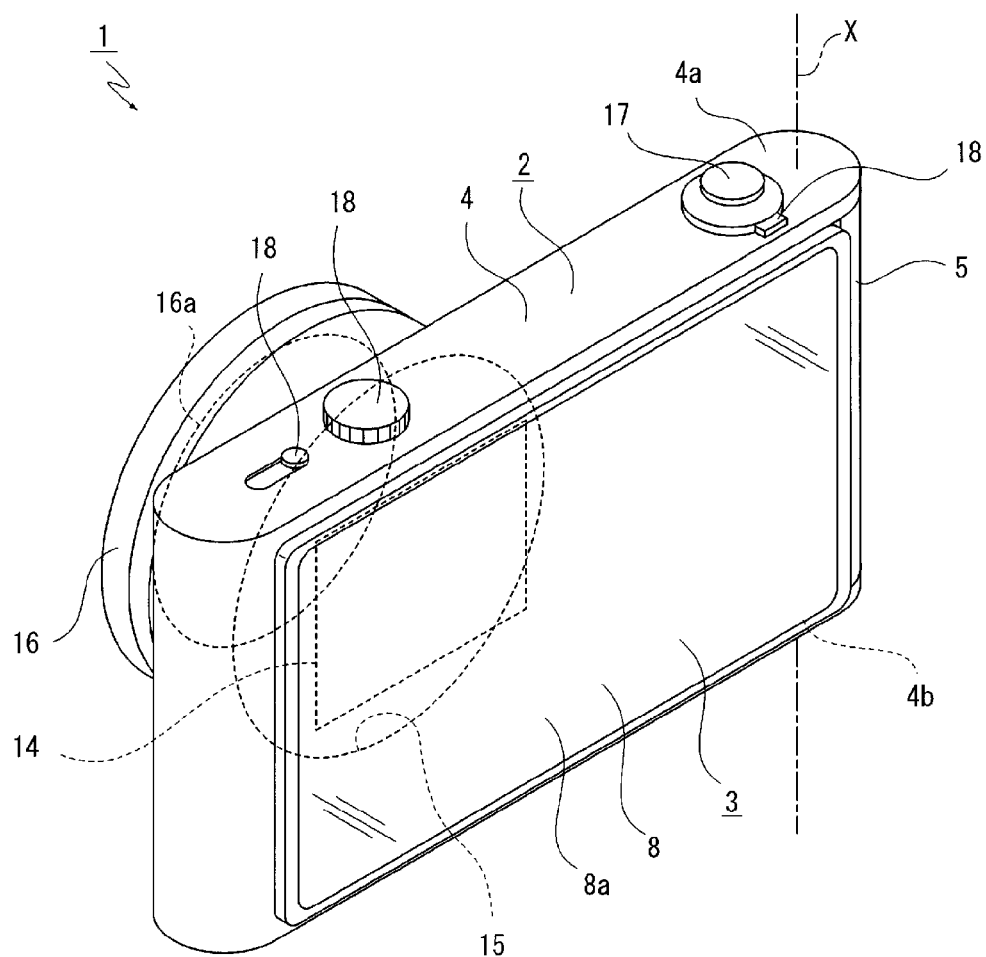
FIGS. 1A and 1B are a perspective view and a front view of an image capturing apparatus according to an embodiment of the present technology.
Figure 1B:
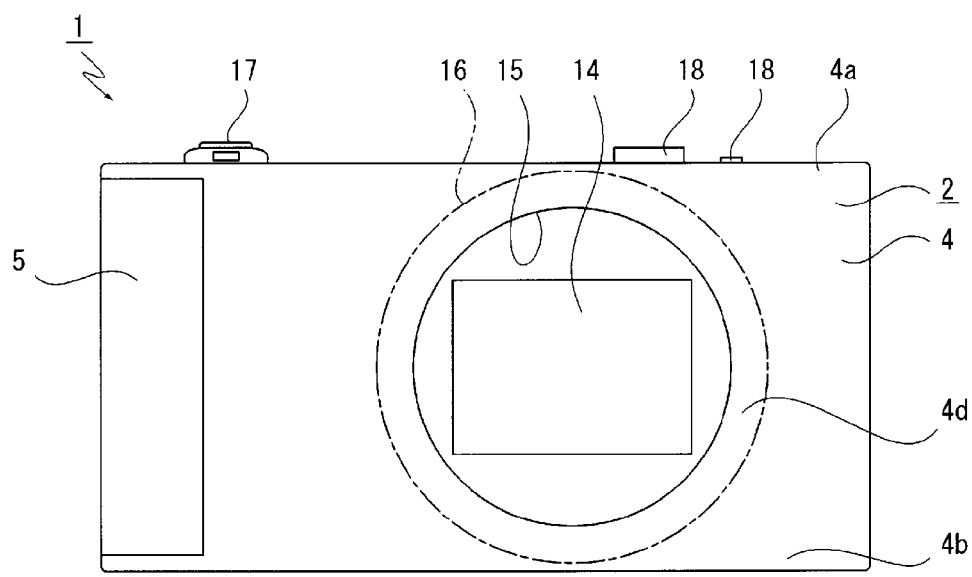
Figure 2:
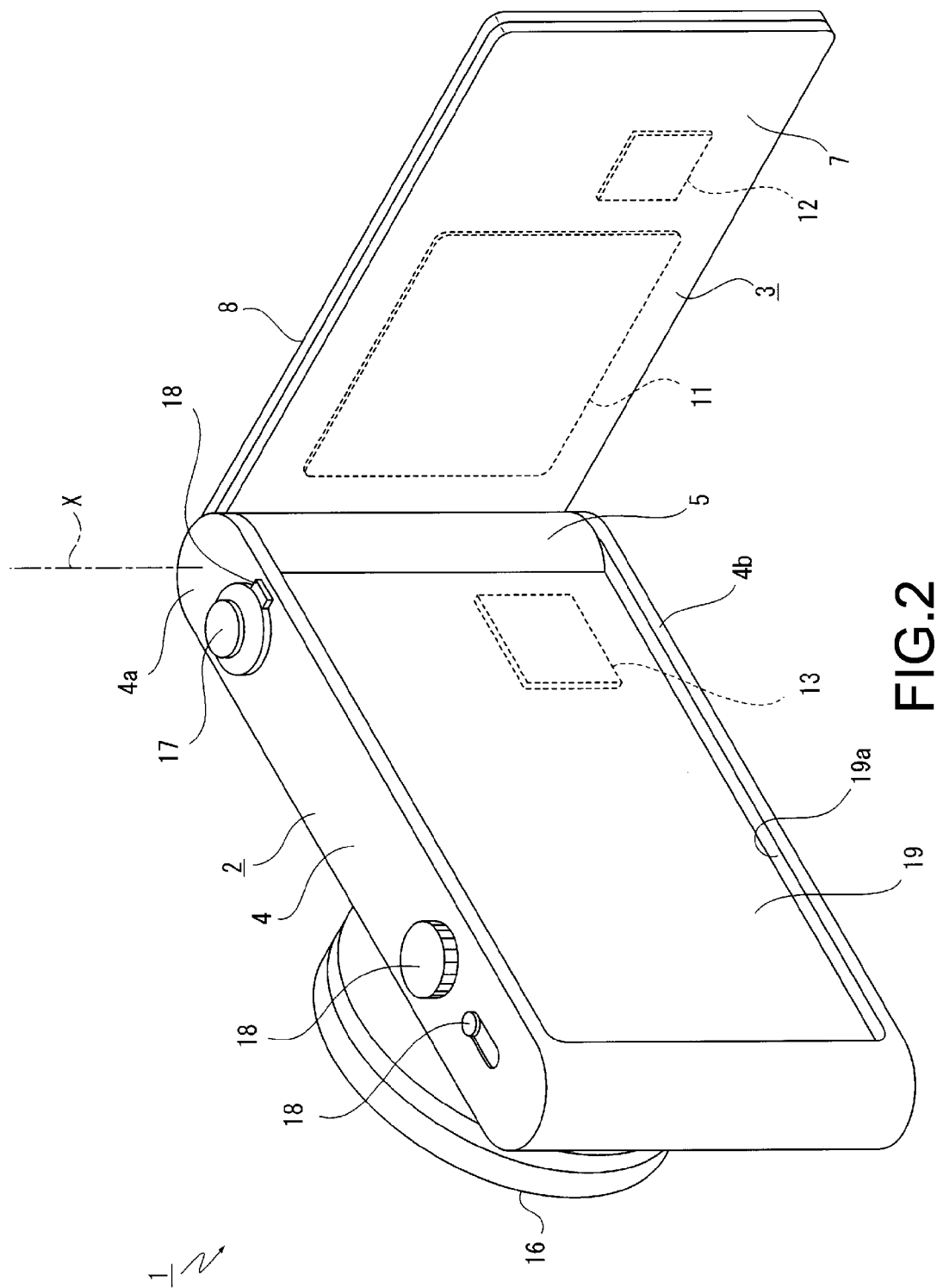
FIG. 2 is a perspective view showing a status that a display unit turns centering around a first turning axis to an apparatus main body.

An image capturing apparatus 1 according to the embodiment includes a horizontally long apparatus main body 2 where necessary parts are disposed inside and outside and a display unit 3 detachable to the apparatus main body 2 as shown in FIGS. 1A and 1B and FIG. 2.

Unless otherwise noted, the left and right and up and down directions are described with the display unit 3 stored in the apparatus main body 2 in the following description.

The apparatus main body 2 includes an approximately cuboid housing 4 and an approximately cylindrical holding unit 5. As the holding unit has a simple approximately cylindrical shape, components can be easily formed.

Figure 3:
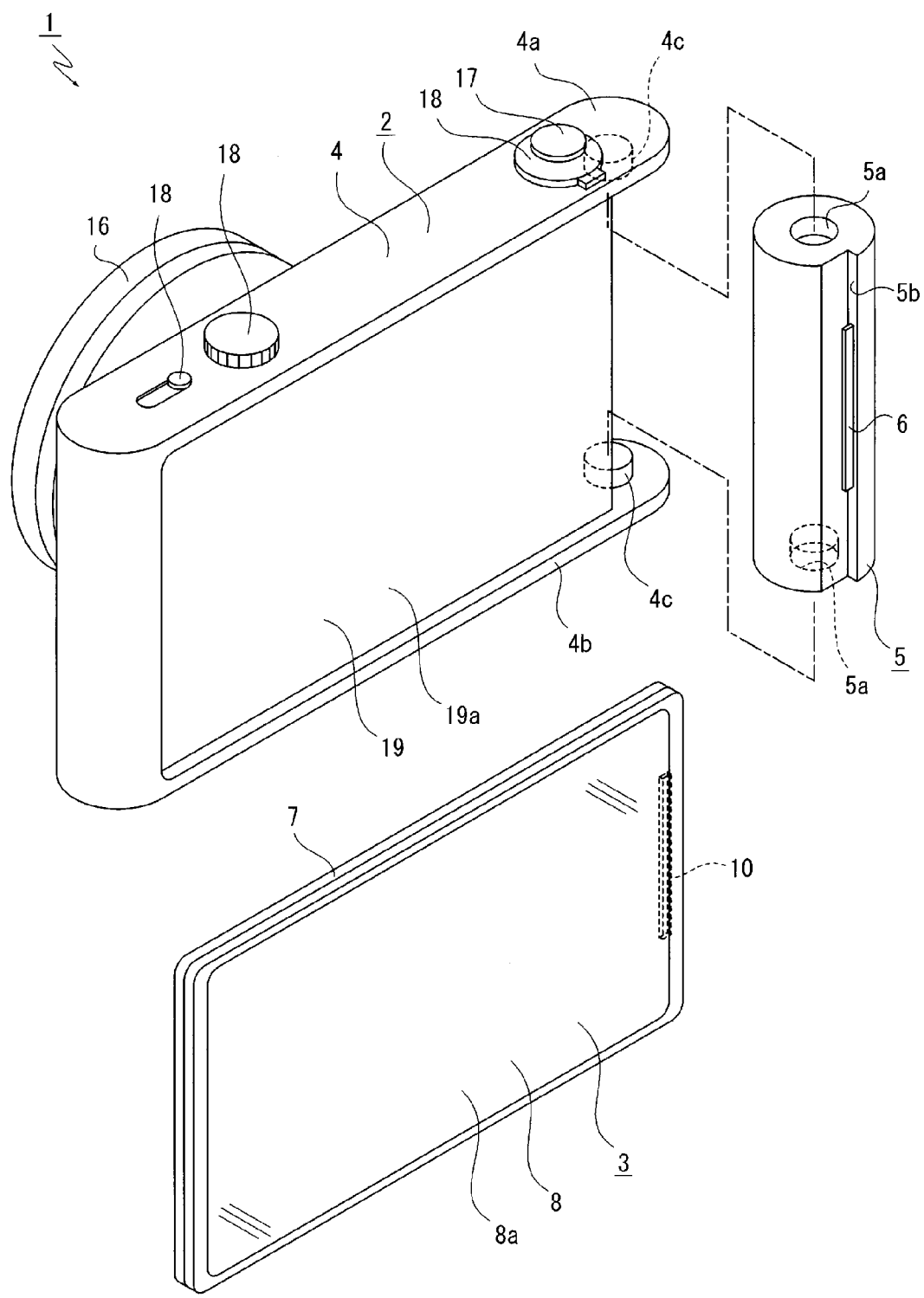
FIG. 3 is an exploded perspective view showing a housing, a holding unit and a display unit.
Figure 4:
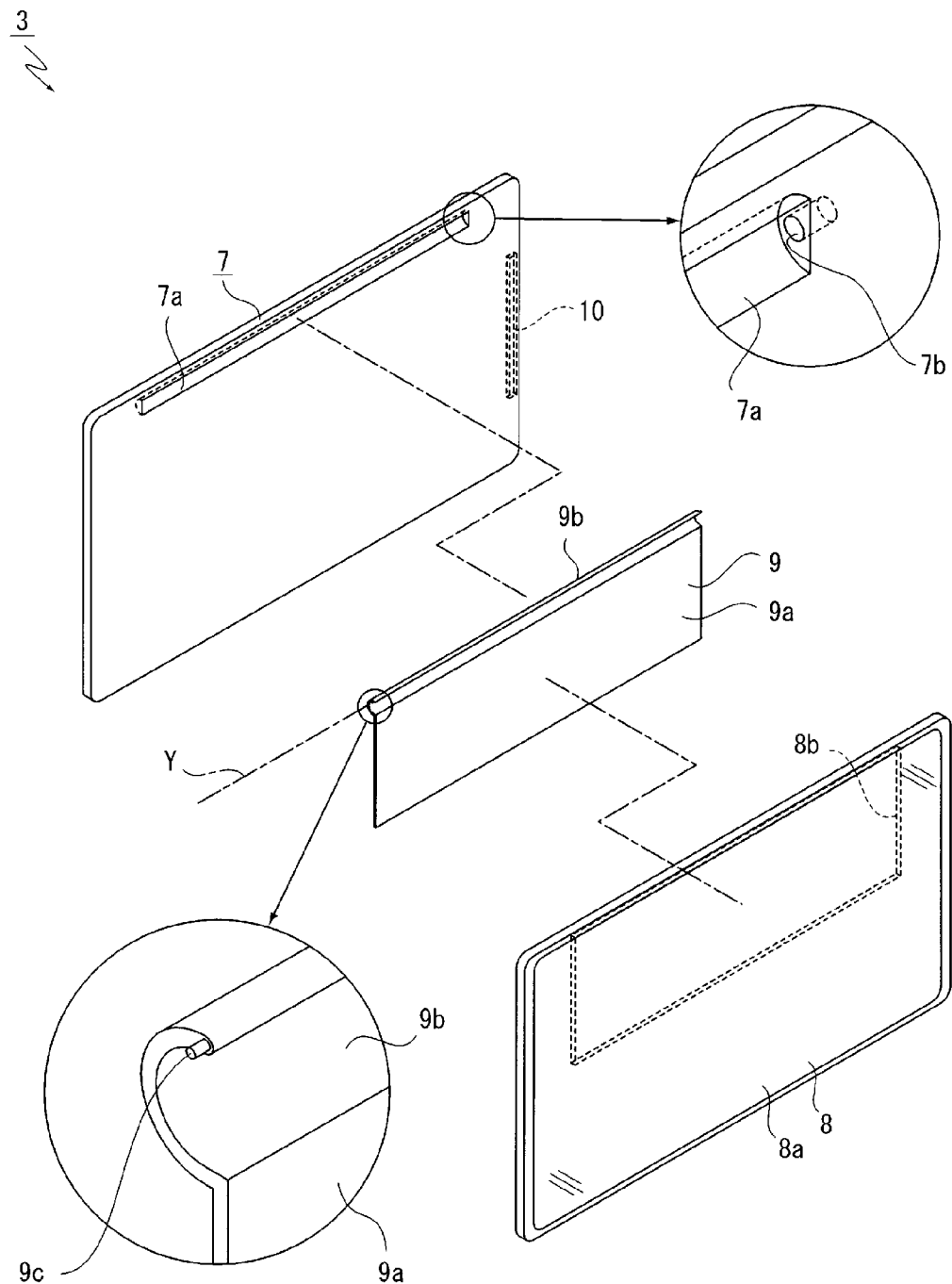
FIG. 4 is an exploded perspective view of the display unit where a base part, a display main unit and a connection part are exploded and enlarged partly.

The housing 4 has a top 4a and bottom 4b and respective right edges thereof are protruded right from an area between the top 4a and the bottom 4b as shown in FIG. 3. Columnar support convex parts 4c are disposed on a lower side of the protruded right edge of the top 4a and an upper side of the protruded right edge of the bottom 4b.

At upper and lower ends of the holding unit 5, cylindrical concave parts 5a to be held are formed. The support convex part 4c disposed at the top 4b of the housing 4 is inserted into the concave part 5a to be held formed at the upper end of the holding unit 5, and the support convex part 4c disposed at the bottom 4b of the housing 4 is inserted into the concave part 5a to be held formed at the lower end of the holding unit 5. In this manner, the holding unit 5 is supported by the housing 4 freely turnable centering around a first turning axis X extending in top and down directions. The first turning axis X is orthogonal to an optical axis, i.e., an axis extending in a back and forth direction of lens groups (not shown) disposed on the image capturing apparatus 1 and is along a straight line connecting respective centers of the support convex parts 4c, 4c disposed on the top 4a and bottom 4b (see FIGS. 1A and 1B and FIG. 2).

Alternatively, the support convex part 4c disposed on the housing 4 and the concave part 5a to be held disposed on the holding unit 5 may be a support concave part 4c and a convex part 5a to be held. In other words, at least one is convex, and the other is concave.

At a part of an outer periphery of the holding unit 5, an engageable concave part 5b extending an up and down direction and opening left, up and down as shown in FIG. 3 is formed. The engageable concave part 5b has a connection terminal 6 where a right end of the display unit 3 is disposed and a terminal described later of the display unit 3 is connected.

The display unit 3 has an approximate rectangular flat plate base part 7, a display main unit 8 having the approximately shape and size of the base part 7 and connecting to the base part 7, and a connection part 9 configured to connect the base part 7 and the display main unit 8.

At a right side of the base part 7, a terminal 10 connecting to the connection terminal 6 of the holding unit 5 is disposed. At an upper end of the base part 7, an axis arrangement groove 7a extending left and right is formed. At the base part 7, axis receiving holes 7b open at left and right side walls of the axis arrangement groove 7a are formed.

The display main unit 8 has a touch panel display 8a on one surface that can detect an external operating position on the surface. The display main unit 8 has an approximately rectangular sliding concave part 8b at an approximately upper half of the surface opposite to the display 8a.

As the touch panel display 8a is used, no manipulandum such as a button is necessary, thereby providing a large-sized screen.

The connection part 9 has an approximately rectangular flat plate slide part 9a, an axis holding part 9b formed semicircular continuously at upper end of the slide part 9a, and cylindrical axis parts 9c, 9c protruded laterally from left and right ends of the axis holding part 9b. A straight line connecting centers of the axis parts 9c, 9c is taken as a second turning axis Y orthogonal to the first turning axis X. The axis holding part 9b of the connection part 9 is inserted into the axis arrangement groove 7a of the base part 7, and the axis parts 9c, 9c are inserted into the axis receiving holes 7b, 7b. Thus, the connection part 9 is turnable to the base part 7 taking the axis parts 9c, 9c (the second turning axis Y) as supporting points.

Figure 5A:
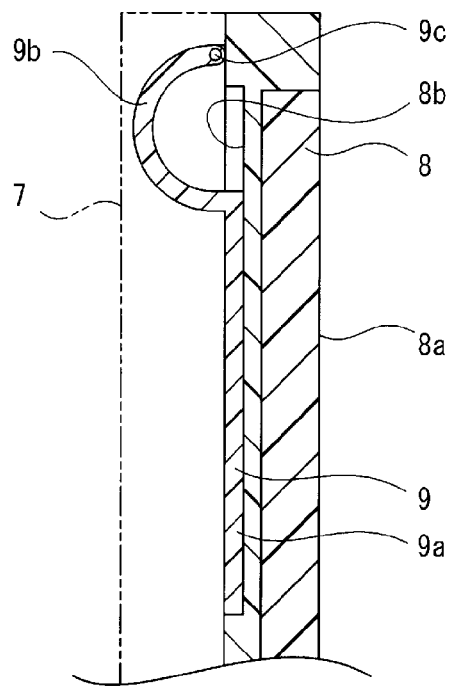
FIG. 5A is an enlarged cross-sectional view where the display main unit is in a first sliding position.
Figure 5B:
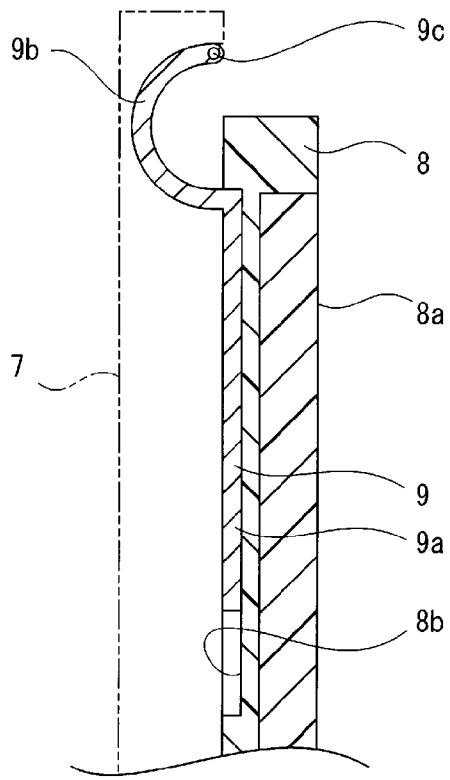
FIG. 5B is an enlarged cross-sectional view where the display main unit is in a second sliding position.

The slide part 9a of the connection part 9 is inserted into the sliding concave part 8b of the display main unit 8. Thus, the display main unit 8 is slidable in an up and down direction to the slide part 9a and is also slidable to the base part 7. At this time, in the display main unit 8, a first sliding position is that the slide part 9a is slid upward (see FIG. 5A) and a second sliding position is that the slide part 9a is slid downward (see FIG. 5B).

When the display main unit 8 is in the first sliding position, the connection part 9 is restricted to turn to the base part 7. When the display main unit 8 is in the second sliding position, the connection part 9 can turn to the base part 7.

Figure 6A:
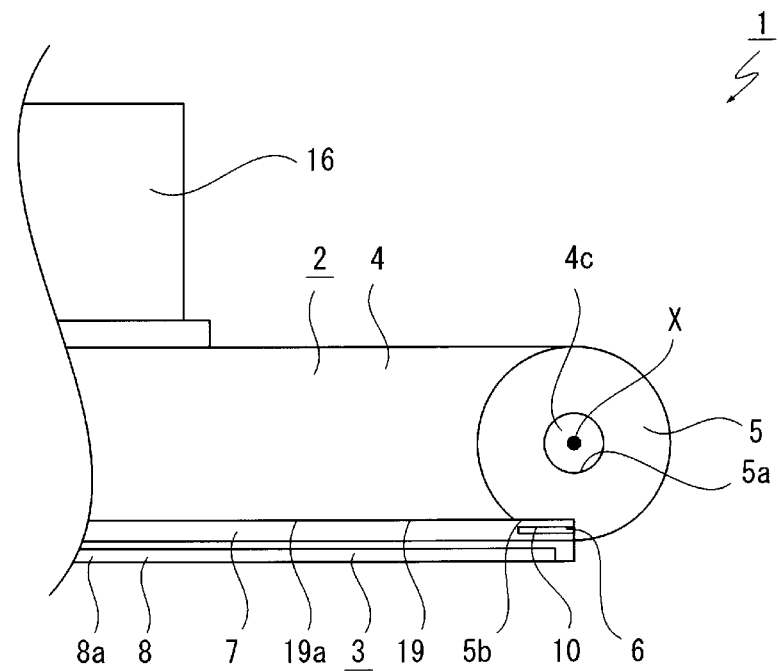
FIG. 6A is a schematic explanatory cross-sectional view of a storing status of the display unit.
Figure 6B:
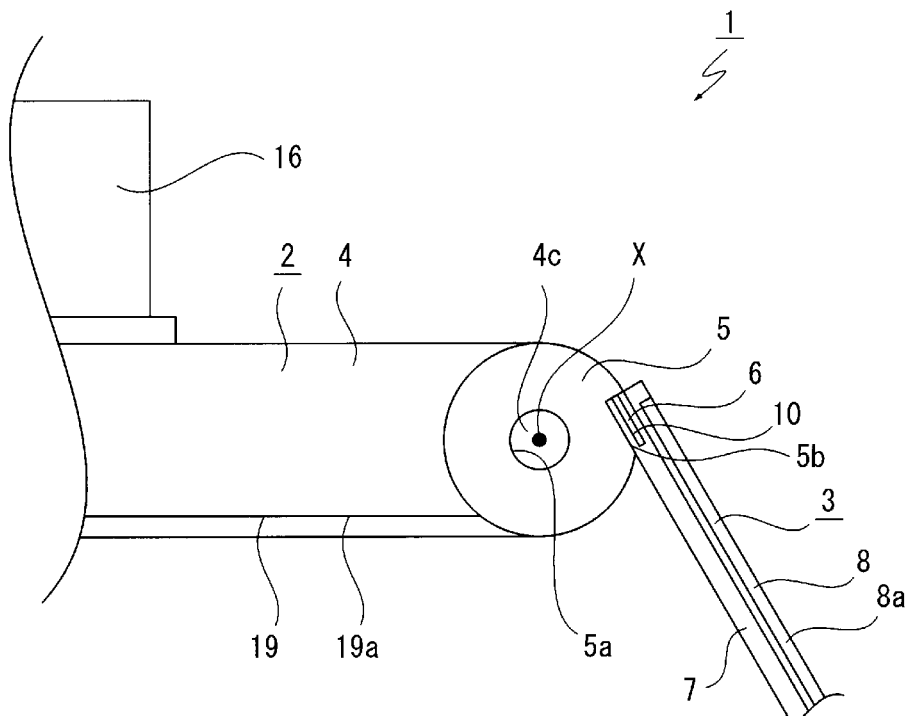
FIG. 6B is a schematic explanatory cross-sectional view of a status that the display unit turns centering around the first turning axis to the apparatus main body.

In this manner, as shown in FIG. 6, the display unit 3 turns accompanied by the turn of the holding unit 5 and is opening and closing to the apparatus main body 2. Also, the display main unit 8 turns to the base part 7 accompanied by the turn of the connection part 9 centering around the second turning axis Y.

As shown in FIGS. 1A and 1B and FIG. 2, when the connection terminal 6 and the terminal 10 are connected, it is possible to pass information necessary for displaying the display 8a and contact positional information from outside of the touch panel and supply electrical power necessary to display an image on the display 8a.

To the base part 7, a buttery 11 for supplying electrical power for operating the display unit 3 separated from the apparatus main body 2 is detachable as shown in FIG. 2.

As the buttery 11 mounted to the display unit 3 can be used as an auxiliary buttery for supplying electrical power to the display 8, the display 8 can be driven for a long time. In addition, as the display unit 3 can be used even if no electrical power is supplied from the apparatus main body 2, it is suitable to the case that the display unit 3 is used by detaching from the apparatus main body 2.

Inside of the display main unit 8, an acceleration sensor (not shown) is disposed. Signals from the acceleration sensor are used for determining a direction of a character or an image displayed on the display 8a. In other words, along with an attitude and a direction of the display 8a, the direction of the image or the character displayed is adapted.

In the display unit 3, a transmitting part 12 capable of transmitting a control signal relating to at least capturing, and in the apparatus main body 2, a receiving part 13 capable of receiving the control signal transmitted from the transmitting part 12, as shown in FIG. 2. The transmitting part 12 can transmit the control signal while the display unit 3 is detached from the apparatus main body 2. In this manner, a photograph or a moving picture can be captured by remote operating the image capturing apparatus 1 while the display unit 3 is detached from the apparatus main body 2, for example.

As described above, the display unit 3 is detachable to the apparatus main body 2 and the receiving part 13 is capable of receiving a transmission signal transmitted from the transmitting part 12 in the display unit 3. It is thus possible to remote operate the display unit 3 distant from the apparatus main body 2.

Inside of the housing 4, an image capturing element 14 for converting an optical image of an object into an electrical signal, optical components and electronic components (not shown) and the like are arranged at predetermined positions, as shown in FIGS. 1A and 1B. At a front surface of the housing 4, a lens mount part 4d is disposed. At an approximately center of the lens mount part 4d, a light passing circular hole 15 is formed. At the lens mount part 4d, a lens 16 is disposed to cover a front surface of the light passing hole 15. The lens 16 is configured of a zoom lens, a wide angle lens and a telephoto lens including a combination of a convex lens and a concave lens and has an image capturing lens 16a at a front end.

Alternatively, the lens 16 may be disposed at the housing 4 with no lens mount part 4d.

The image capturing element 14 is disposed at an inside of the light passing hole 15 viewed from the front surface of the image capturing apparatus 1. The lens 16 may be interchangeable or may be disposed integrally with the housing 4.

At the top 4a of the housing 4, an image capturing button 17 and a variety of manipulandums 18, 18, . . . are arranged. As the manipulandums 18, 18 . . . , a power source button, the image capturing button, a zoom switch, an image capturing mode switching knob and the like are disposed, for example.

At a rear surface of the housing 4, a storing space 19 is disposed. As shown in FIGS. 2 and 3, the storing space 19 has a storing concave part 19a being open backwards and having approximately the same shape and size as the base part 7 of the display unit 3. By disposing the storing concave part 19a at the rear surface of the housing 4, the display unit 3 can be stably held by the housing 4.

In addition, by disposing the storing concave part 19a at the storing space 19 and inserting at least a part of the display unit 3, e.g., the base part 7 into the storing concave part 19a, a protrusion amount of the display unit backwards is decreased, whereby downsizing the image capturing apparatus 1 (see FIGS. 1A and 1B).

In addition, the storing concave part 19a may be formed to have a depth that both of the base part 7 and the display main unit 8 of the display unit 3 can be inserted. In this case, a cutout may be desirably formed at a side wall of the storing concave part 19a for pulling out the display unit 3 from the storing concave part 19a easily. In this manner, the display unit 3 is not protruded backwards from the housing 4, whereby further downsizing the image capturing apparatus 1.

The display main unit 8 of the display unit 3 is in a superimposed position when the base part 7 is overlaid, and is in an extended position when the base part 7 is adjacent in an axial direction of the first turning axis X.

In addition, the display unit 3 is in a storing status when the base part 7 is inserted into the storing concave part 19a and the display main unit 8 is in the superimposed position, and is in a turning status when the display unit 3 turns at approximately 180 degrees centering around the first turning axis X from the apparatus main body 2.

<2. Operation of Image Capturing Apparatus>

Next, an operation of the image capturing apparatus 1 will be described.

[2-1. Turn Centering Around First Turning Axis]

Firstly, turning of the display unit 3 centering around the first turning axis X will be described referring to FIG. 7.

Figure 7A:
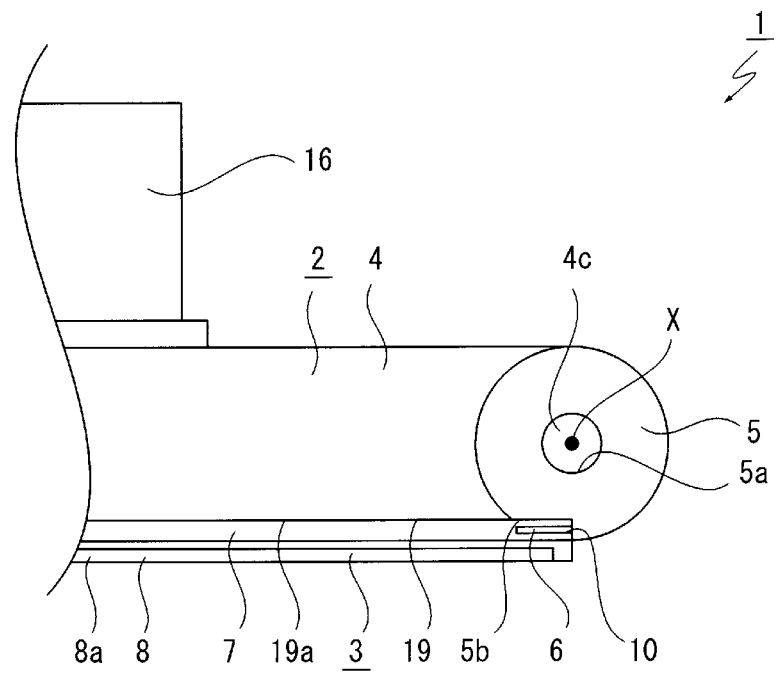
FIG. 7A is a schematic explanatory cross-sectional view of the storing status of the display unit.

When the display unit 3 turns to the apparatus main body 2, the display main unit 8 of the display unit 3 protruded backwards to the apparatus main body 2 is held in the storing status as shown in FIG. 7A. Next, the display main unit 8 held is pulling out backwards from the storing concave part 19a, and the display unit 3 is started to turn to the apparatus main body 2 centering around the first turning axis X. In this manner, the display unit 3 turns centered around the first turning axis X together with the holding unit 5 to the housing 4.

Figure 7B:
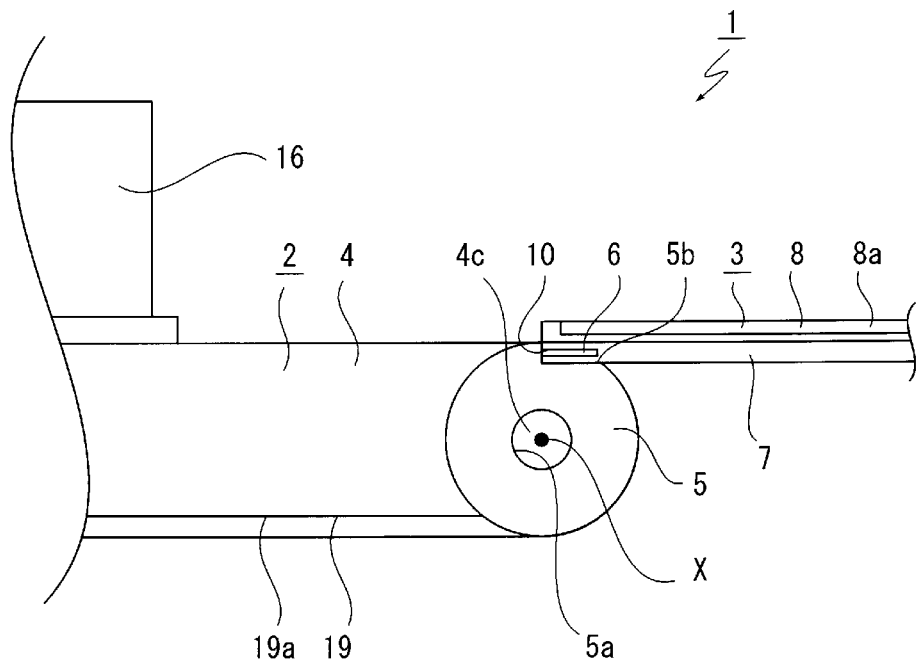
FIG. 7B is a schematic explanatory cross-sectional view of a turning status of the display unit.

The display unit 3 is restricted to turn in contact with a right end of the apparatus main body 2 in the turning status when the display unit 3 turns at approximately 180 degrees centering around the first turning axis X, as shown in FIG. 7B.

Figure 8:
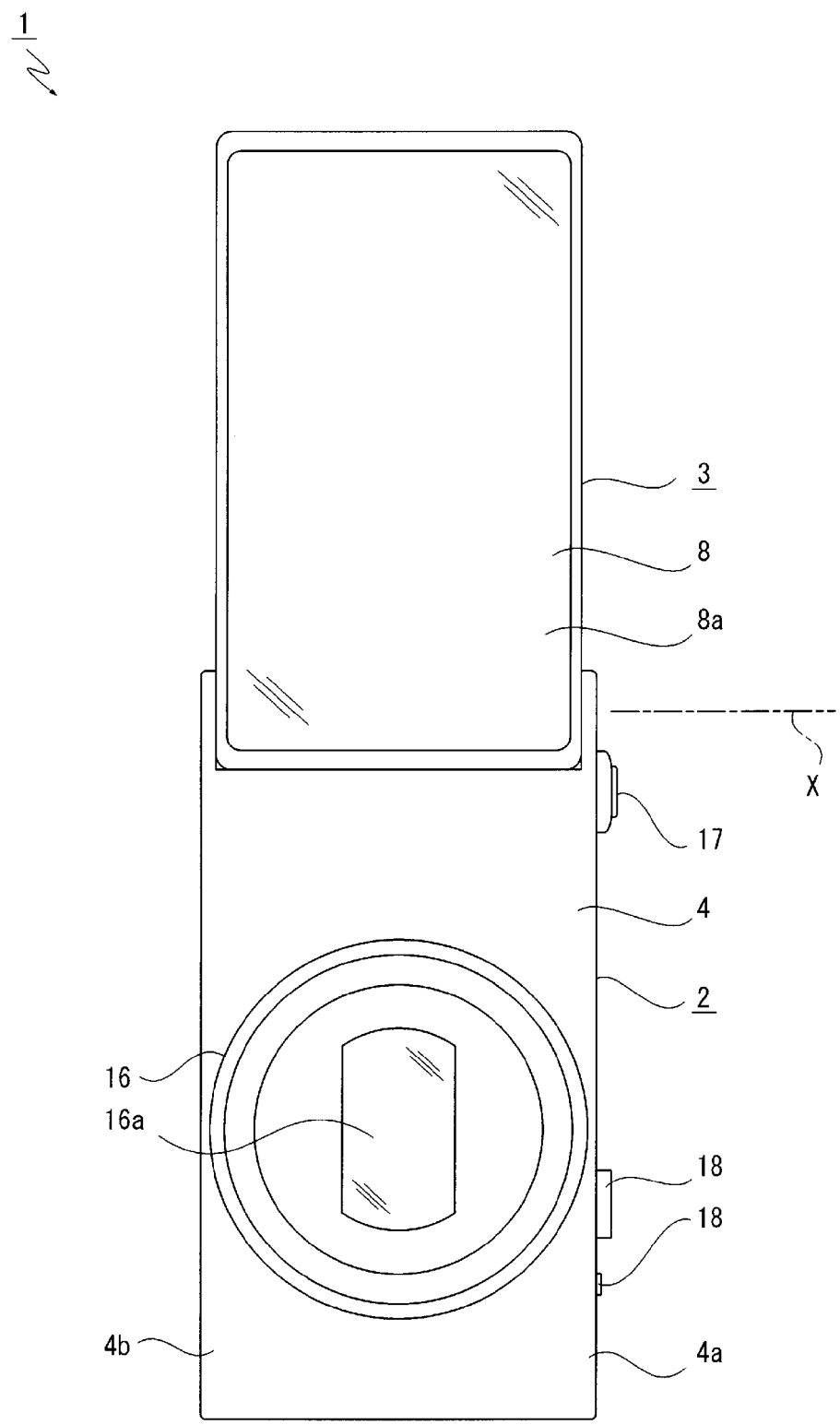
FIG. 8 is a front view showing the turning status of the display unit.

By turning the display unit 3 to the turning status, the display 8a faces to the object side (see FIG. 8). Accordingly, the display 8a and the image capturing lens 16a face to the same direction. Thus, the turning status of the display unit 3 is suitable to capture myself (selfie). Especially when the selfie is taken with the apparatus main body 2 being vertically long as shown in FIG. 8, the display 8a and the image capturing lens 16a line up and down and face the same direction. Therefore, the own position in the image displayed on the display 8a is easily perceived and the own position in the image can be easily adjusted.

As shown in FIG. 8, the holding unit 5 is positioned at an upper side of the housing 4 and the display unit 3 is positioned at a still upper side of the holding unit 5, thereby stabilizing a holding status of the housing 4 upon an image capture.

In addition, as the image capturing button 17 is positioned at a right end of the upper end of the housing 4, the image capturing button 17 is easily pushed down by a finger of the image capturer. Alternatively, the image capturing button 17 may be positioned at a left end of the upper end of the housing 4.

[2-2. Turn Centering Around Second Turning Axis]

Figure 9:
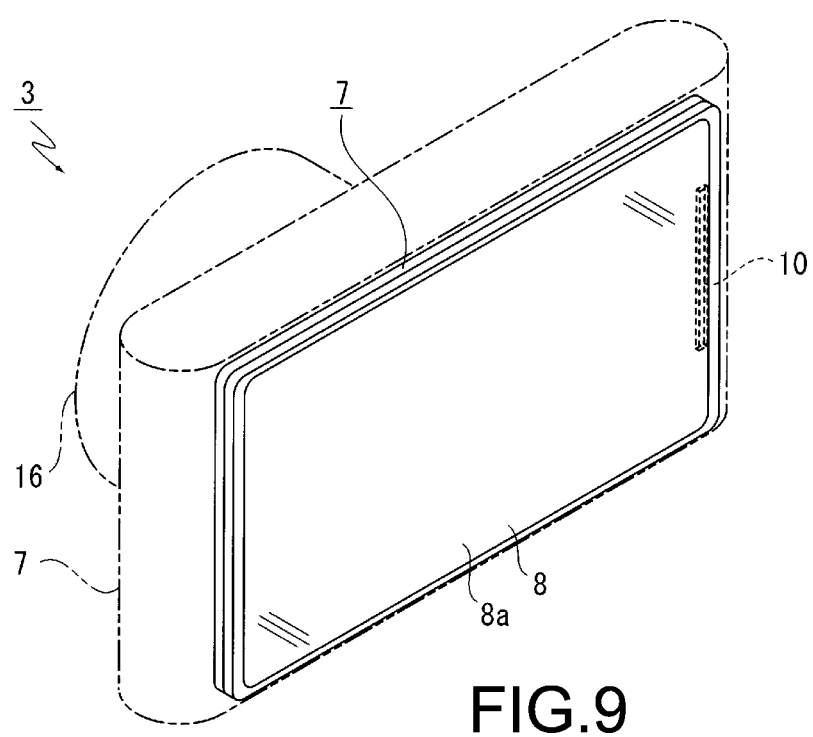
FIG. 9 is a perspective view showing the storing status of the display unit.

Next, turning of the display main unit 8 of the display unit 3 centering around the second turning axis Y will be described referring to FIGS. 9 to 11.

Figure 10A:
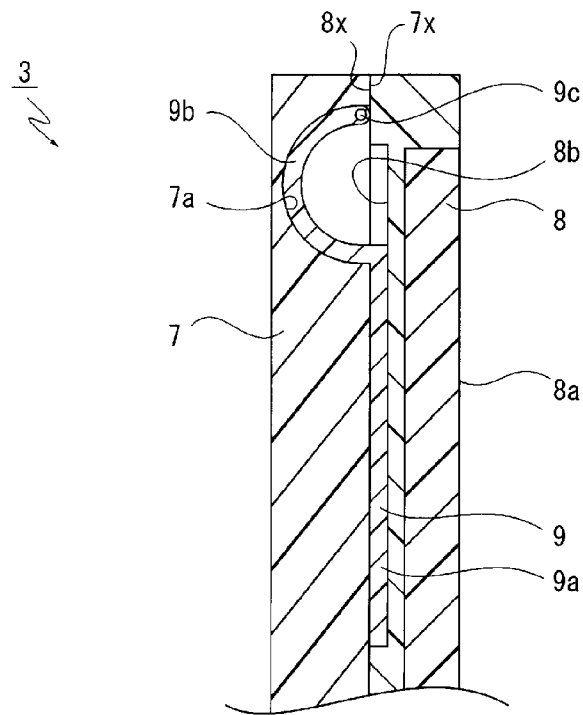
FIG. 10A is an enlarged cross-sectional view where the display main unit is in a first sliding position.

Here, in the storing status of the display unit 3 (see FIG. 9), turning the display main unit 8 centering around the second turning axis Y will be described. In this status, an upper end 7x of the base part 7 is in contact with an upper end 8x of the display main unit 8 as shown in FIG. 10A, the display main unit 8 is restricted to turn to the base part 7 centering around the second turning axis Y.

Figure 10B:
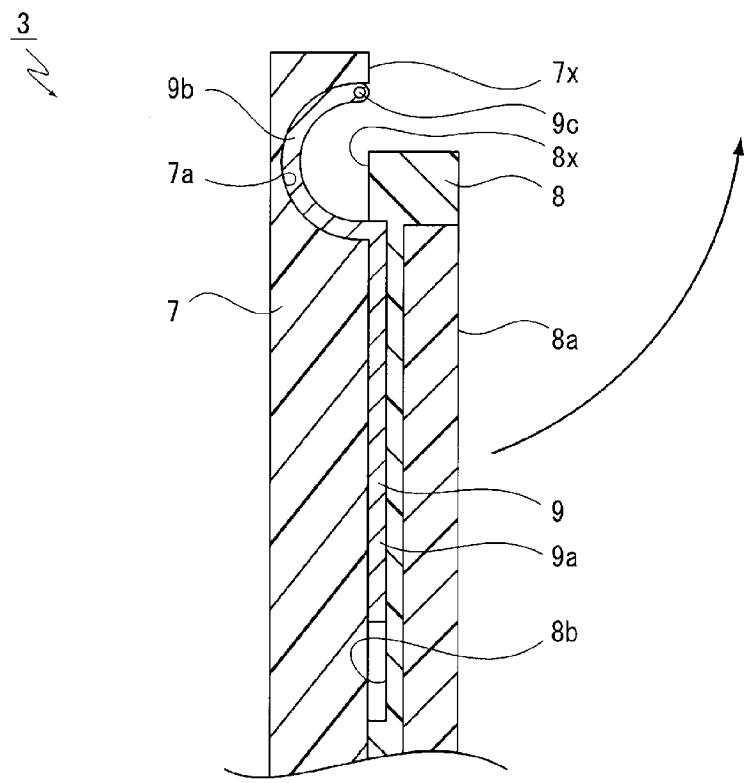
FIG. 10B is an enlarged cross-sectional view where the display main unit is in a second sliding position.

When the display main unit 8 turns centering around the second turning axis Y, the display main unit 8 is slid downward to the base part 7, as shown in FIG. 10B. At this time, a cylindrical axis part 9c of the connection part 9 is supported by the base part 7 and is not moved to the base part 7. Within a moving range of the slide part 9a in the connection part 9 within the sliding concave part 8b of the display main unit 8, the display main unit 8 is slide downward to the base part 7. In other words, the display main unit 8 is moved from the first sliding position (FIG. 10A) to the second sliding position (FIG. 10B).

In the status that the display main unit 8 is slid to the second sliding position, the upper end 7x of the base part 7 is no more in contact with the upper end 8x of the display main unit 8 and the upper end 8x of the display main unit 8 is positioned lower than the axis part 9c. Accordingly, in the second sliding position, the display main unit 8 is turnable to the base part 7. At this time, as the upper end 8x of the display main unit 8 is positioned lower than the axis part 9c at a predetermined space, the upper end 7x of the base part 7 does not interfere with the upper end 8x of the display main unit 8 when the turning centering around the second turning axis Y is performed.

In this manner, by being turnable when the display main unit 8 is slide to the base part 7 in the second sliding position, the upper end 8x of the display main unit 8 does not interfere with the upper end 7x of the base part 7, the display main unit 8 is not in contact with the base part 7, and the display main unit 8 and the base part 7 are prevented from being scratching.

By being contact the upper end 7x of the base part 7 with the upper end 8x of the display main unit 8 to restrict turning of the display main unit 8 to the base part 7, backlash of the display main unit 8 to the base part 7 is prevented, excellent visibility to the display 8a can be provided when the image is captured in the storing status, and ease of use of the image capturing apparatus 1 is improved.

Next, the display main unit 8 is started to turn at the status that the display main unit 8 is in the second sliding position as shown in FIG. 10B. An arrow shown in FIG. 10B represents a turning direction of the display main unit 8 turned centering around the second turning axis Y.

Figure 11:
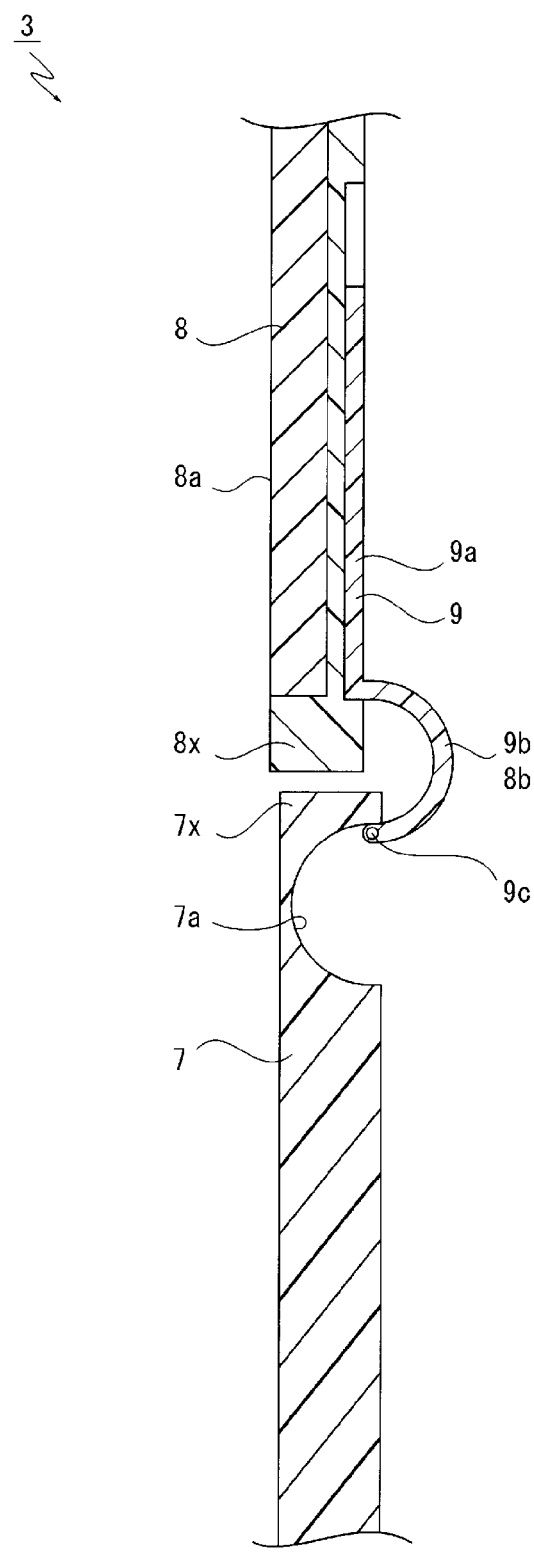
FIG. 11 is an enlarged cross-sectional view showing a status that the display main unit is in an extended position.
Figure 12:
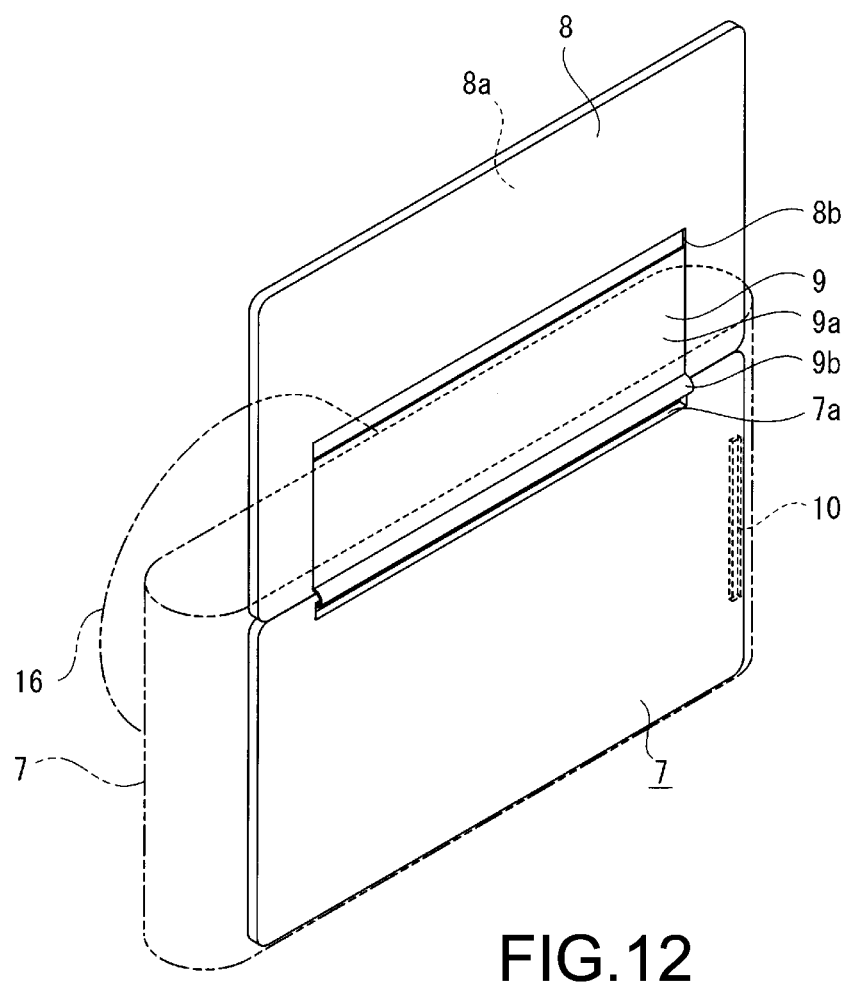
FIG. 12 is a perspective view showing a status that the display main unit is in an extended position.

FIG. 11 and FIG. 12 show the status that the display main unit 8 turns to the base part 7 in an axis rotating direction of the second turning axis Y (the direction shown by the arrow in FIG. 10B) at approximately 180 degrees of an extended position.

Figure 13:
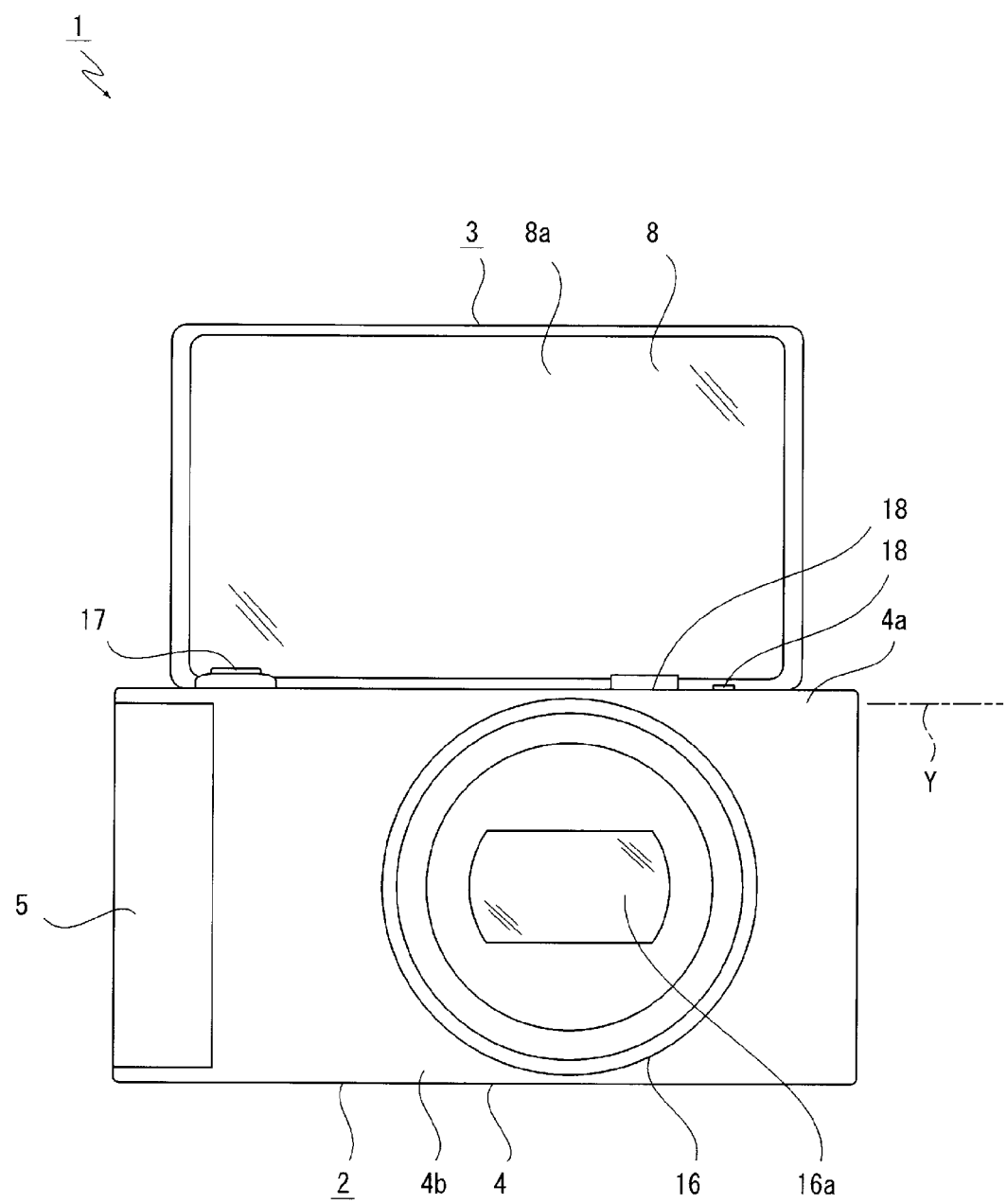
FIG. 13 is a front view showing a status that the display main unit is in an extended position.
Figure 14:
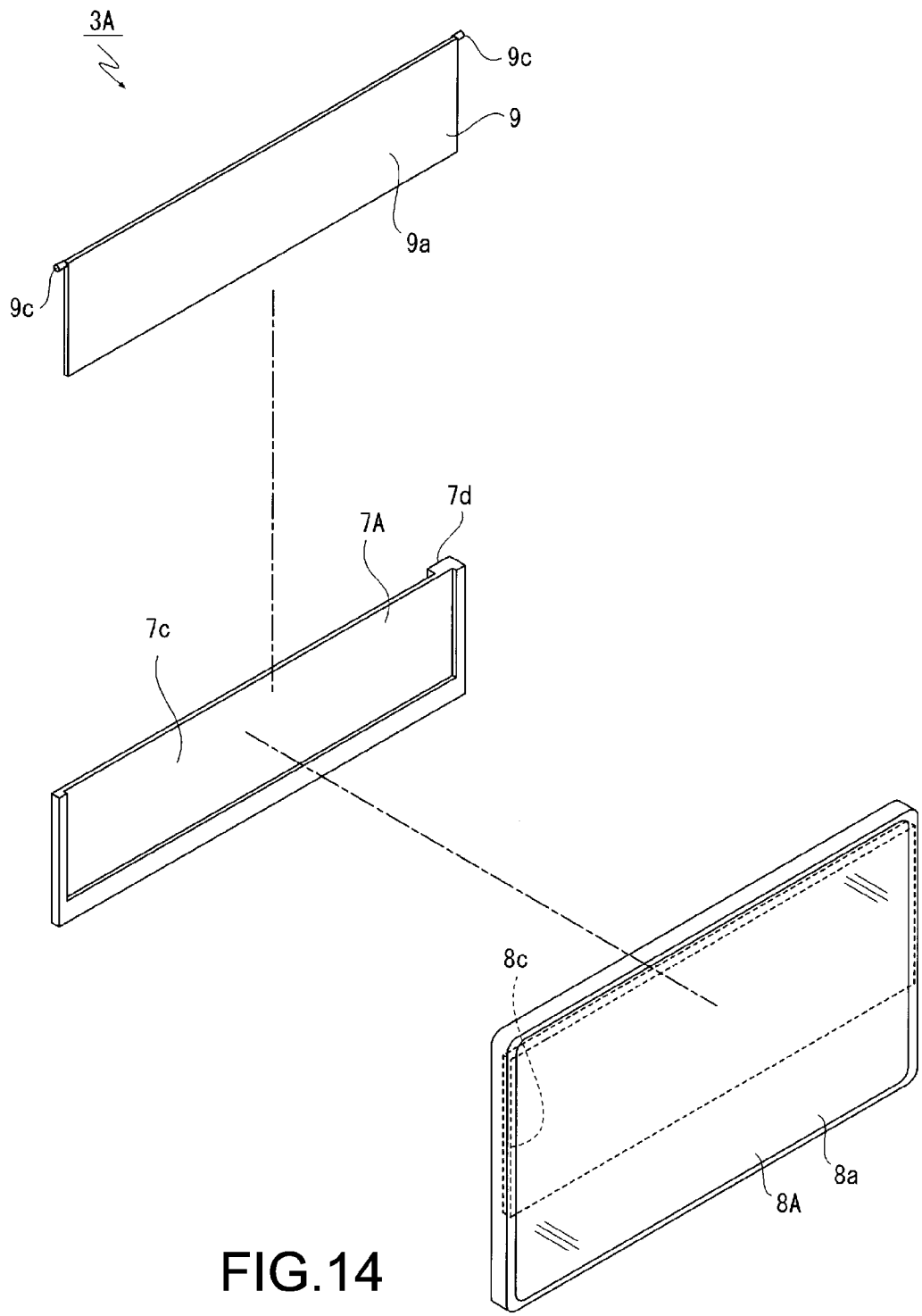
FIG. 14 shows an image capturing apparatus according to a second embodiment along with FIGS. 15 to 20 and is an exploded perspective view of a display unit.
Figure 15:
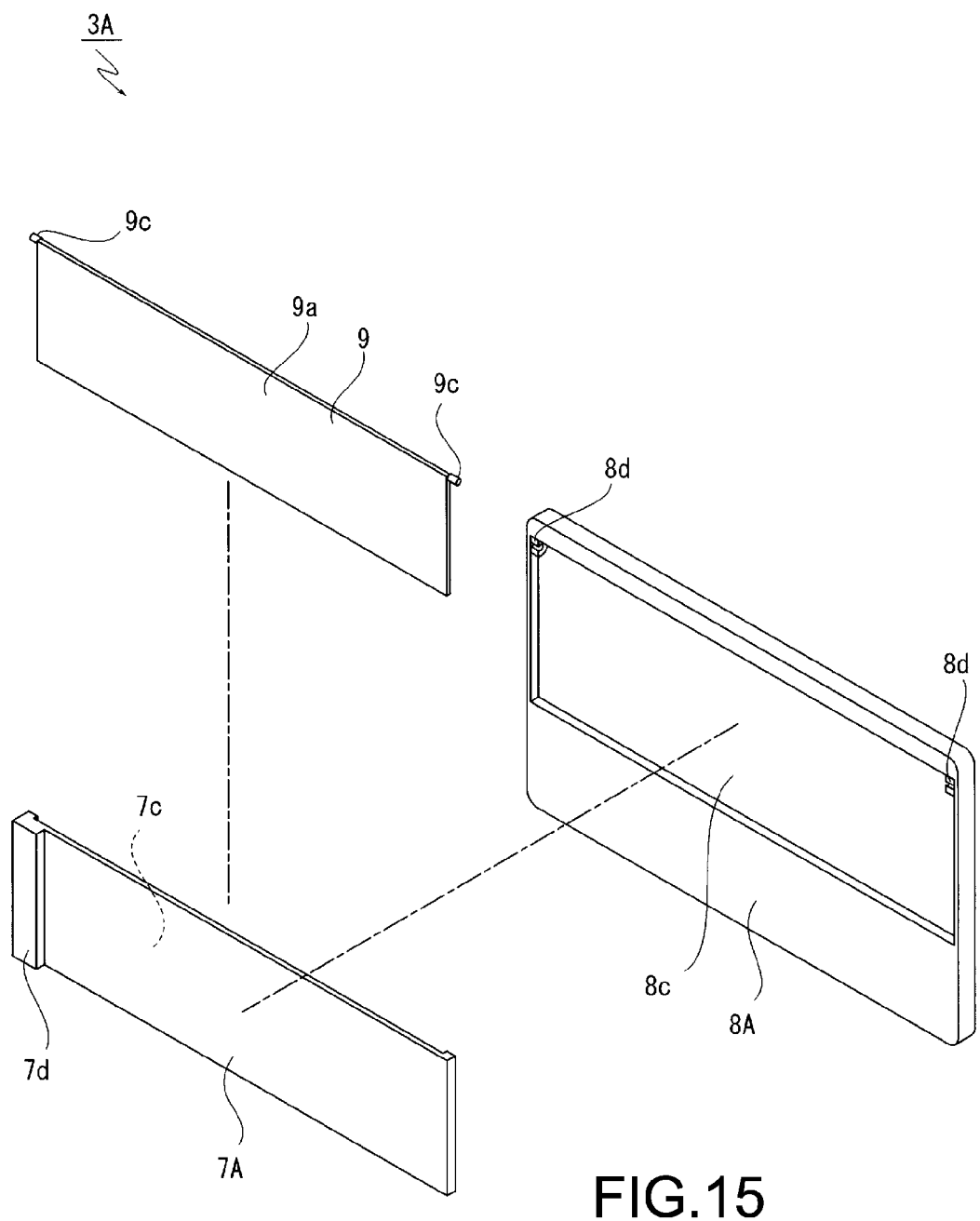
FIG. 15 is an exploded perspective view showing the display unit viewed from other direction.

By turning the display main unit 8 to the base part 7 at approximately 180 degrees of the extended position, the display 8a faces the object side and the extended position of the display unit 3 is suitable to capture myself (selfie). Especially when the selfie is taken with the apparatus main body 2 being horizontally long as shown in FIG. 13, the display 8a and the image capturing lens 16a line up and down and face the same direction. Therefore, the own position in the image displayed on the display 8a is easily perceived and the own position in the image can be easily adjusted.

When the display main unit 8 turns to the base part 7, the display main unit 8 is contacted with the upper end of the base part 7, thereby restricting turning at approximately 180 degrees or more.

<3. Second Embodiment>

Next, an image capturing apparatus 1A according to the second embodiment will be described (see FIG. 14 to FIG. 20).

In the image capturing apparatus 1A according to the second embodiment, a concave part into which the base part and the connection part are inserted is formed at the display main unit of the display unit.

In the description of the second embodiment, the same components as those in the first embodiment are denoted by the same reference numerals, and thus detailed description thereof will be hereinafter omitted. Different components will be mainly described.

In the following description, an up and down direction and a left and right direction are described with the display unit not turning to the apparatus main body in any directions unless otherwise specified.

A display unit 3 of an image capturing apparatus 1A according to the embodiment includes a base part 7A, a display main unit 8A and the connection part 9, as shown in FIGS. 14 to 17. The base part 7A is formed approximate rectangular flat and has a sliding concave part 7c at a rear surface being open backwards and upwards. At a right end of the base part 7A, a holding part 7d protruded forward from the upper end to the lower end is disposed. The holding part 7d is engaged with and supported by an engaging concave part 5b of the holding unit 5.

The display main unit 8 is formed to have an approximately rectangular flat shape greater than the base part 7, has a display 81 at a front surface, and has a storing concave part 8c open to backwards into which the base part 7A and the connection part 9 are inserted at a rear surface. In addition, at left and right side walls of an upper end of the storing concave part 8c, axis holding parts 8d are formed.

The connection part 9 has an approximately rectangular flat plate slide part 9a and cylindrical axis parts 9c, 9c protruded laterally from left and right ends of the axis holding part 9b.

Figure 16:
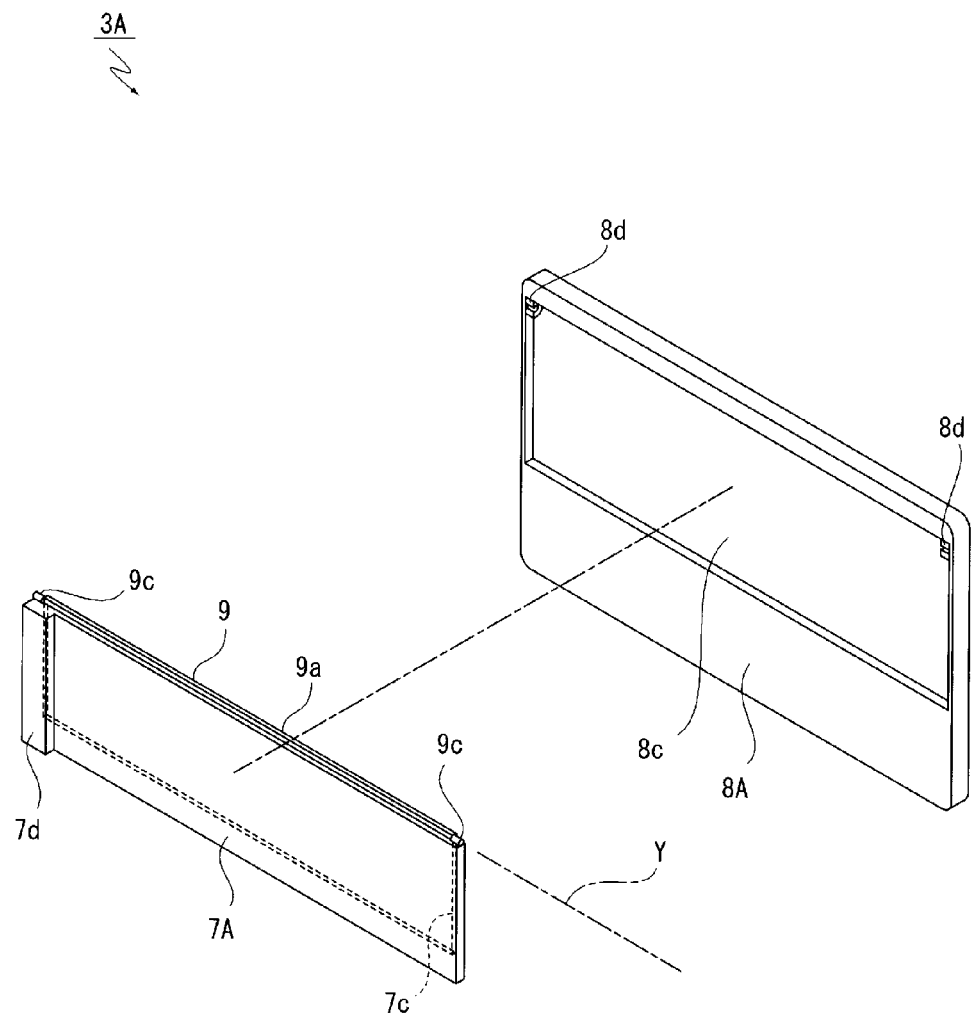
FIG. 16 is an exploded perspective view of the display unit showing a status that the connection part is inserted into a sliding concave part.

Into the sliding concave part 7c of the base part 7A, parts other than the upper end of the slide part 9a of the connection part 9 are inserted, as shown in FIG. 16. At this time, the slide part 9a is slidable up and down with supporting by the sliding concave part 7c. A lower end of the slide part 9a is contacted with a lower wall of the sliding concave part 7c such that the slide part 9a is restricted from further sliding downwards.

Figure 17:
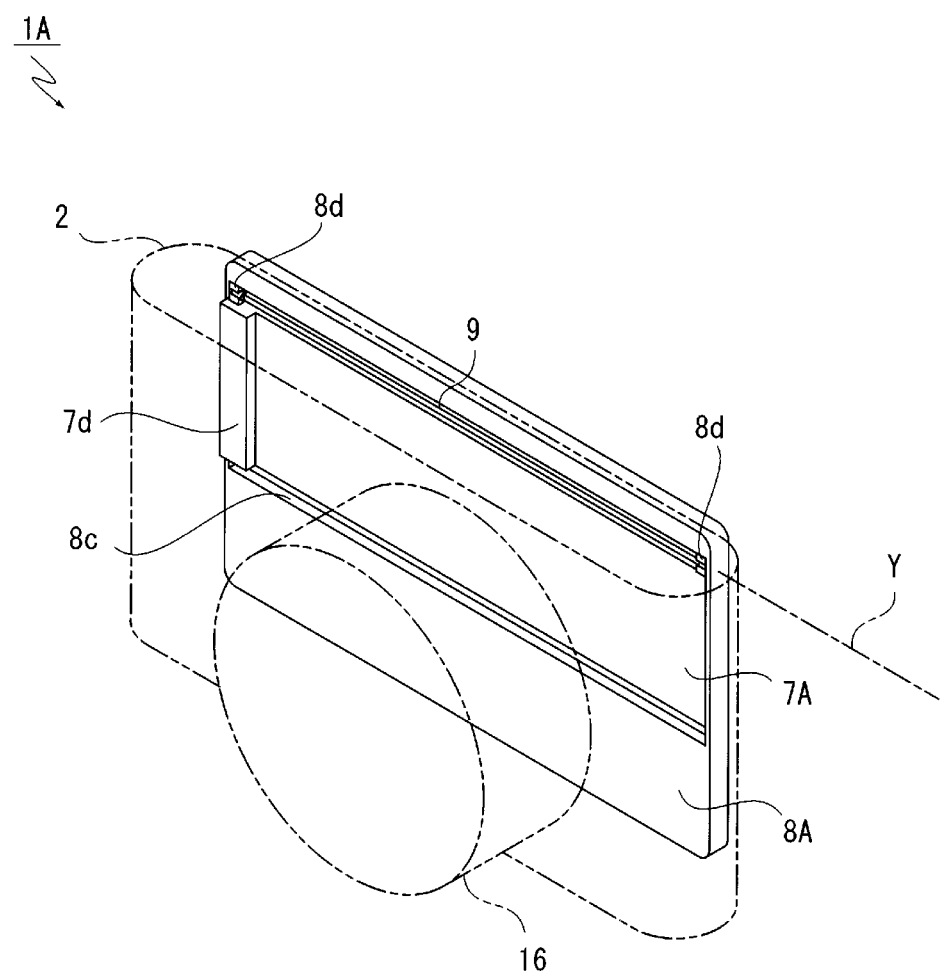
FIG. 17 is a perspective view of the display unit.

Into the storing concave part 8c of the display main unit 8A, the base part 7A and the connection part 9 are inserted with the slide part 9a inserted into the sliding concave part 7c, as shown in FIG. 17. The axis parts 9c, 9c of the connection part 9 are supported by the axis holding parts 8d, 8d, respectively. A line connecting respective centers of the axis parts 9c is defined as the second turning axis Y.

The display main unit 8A can turn to the connection part 9 centering around the second turning axis Y. Accordingly, with the slide part 9a of the connection part 9 inserted into the sliding concave part 7c of the base part 7A, the display main unit 8A can turn to the base part 7A centering around the second turning axis Y.

Figure 18:
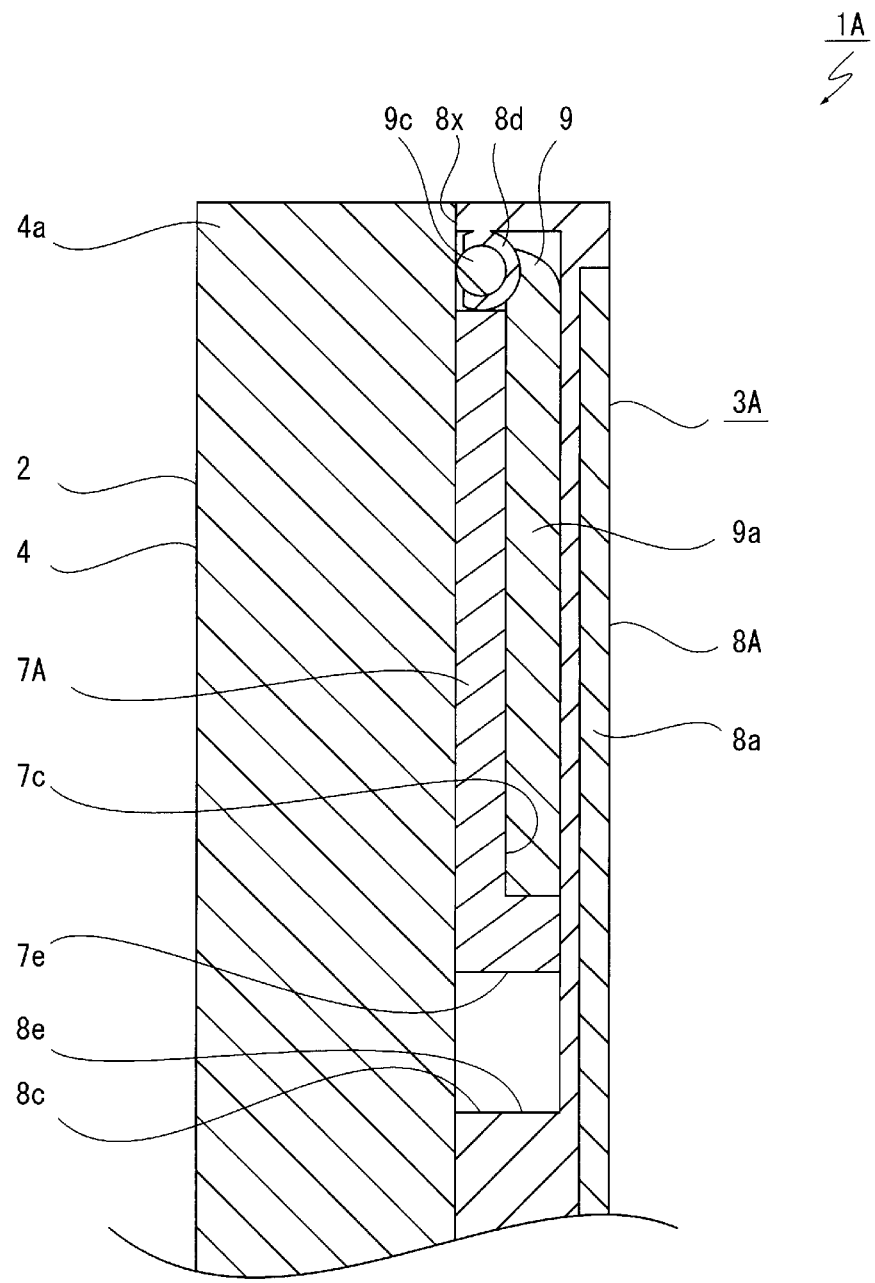
FIG. 18 is an enlarged cross-sectional view showing a status that the display main unit is in the first sliding position.
Figure 19:
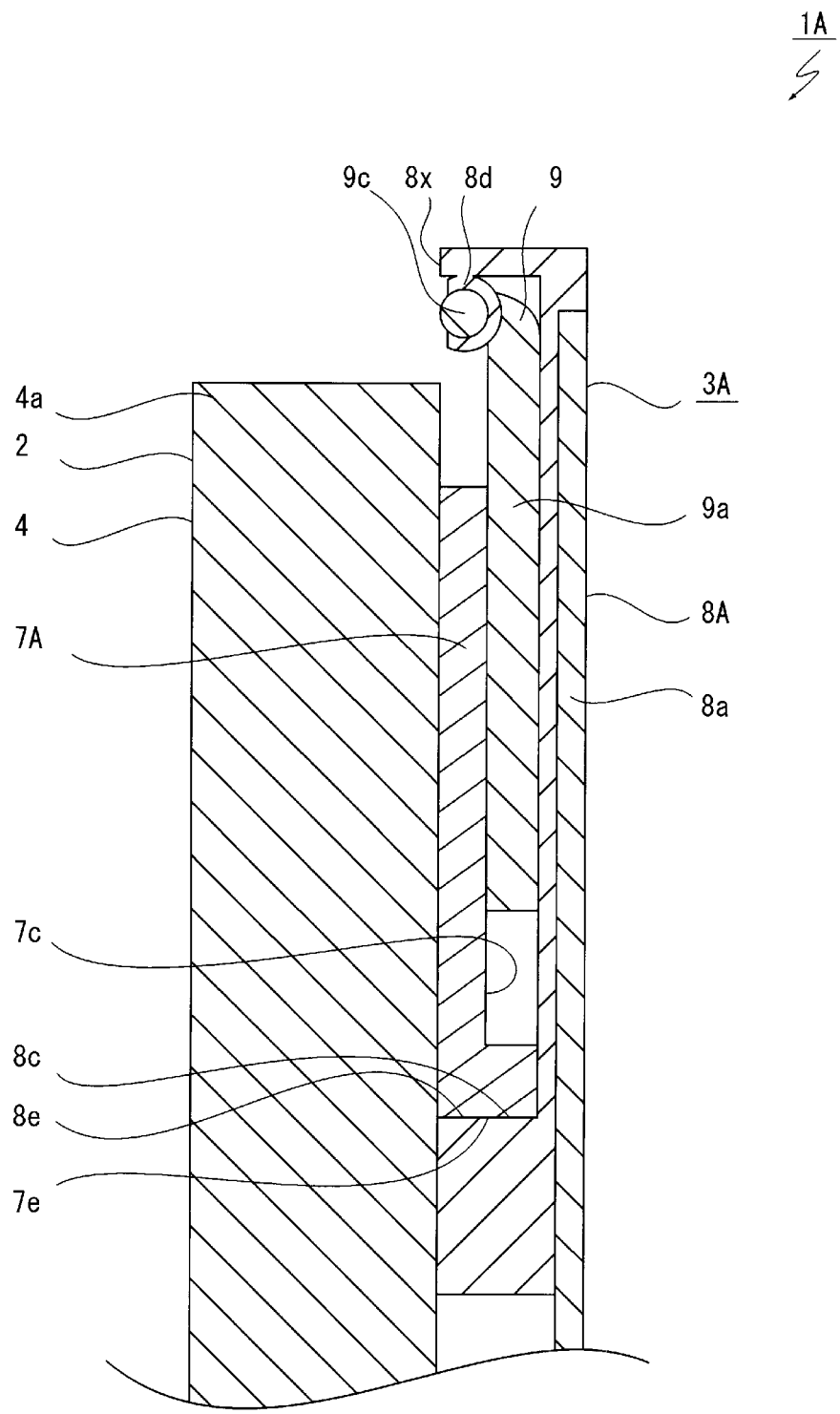
FIG. 19 is an enlarged cross-sectional view showing a status that the display main unit is in the second sliding position.

The display main unit 8A is slidable up and down to the base part 7A accompanied by sliding of the connection part 9 to the base part 7A, as shown in FIGS. 18 and 19. At this time, in the display main unit 8A, a first sliding position is that the base part 7A is slid downward and a second sliding position is that the base part 7A is slid upward. When the display main unit 8A is in the second sliding position, a lower wall 8e of the storing concave part 8c of the display main unit 8A is in contact with a lower end 7e of the base part 7A, whereby the display main unit 8A is restricted from further sliding upwards to the base part 7A.

Figure 20:
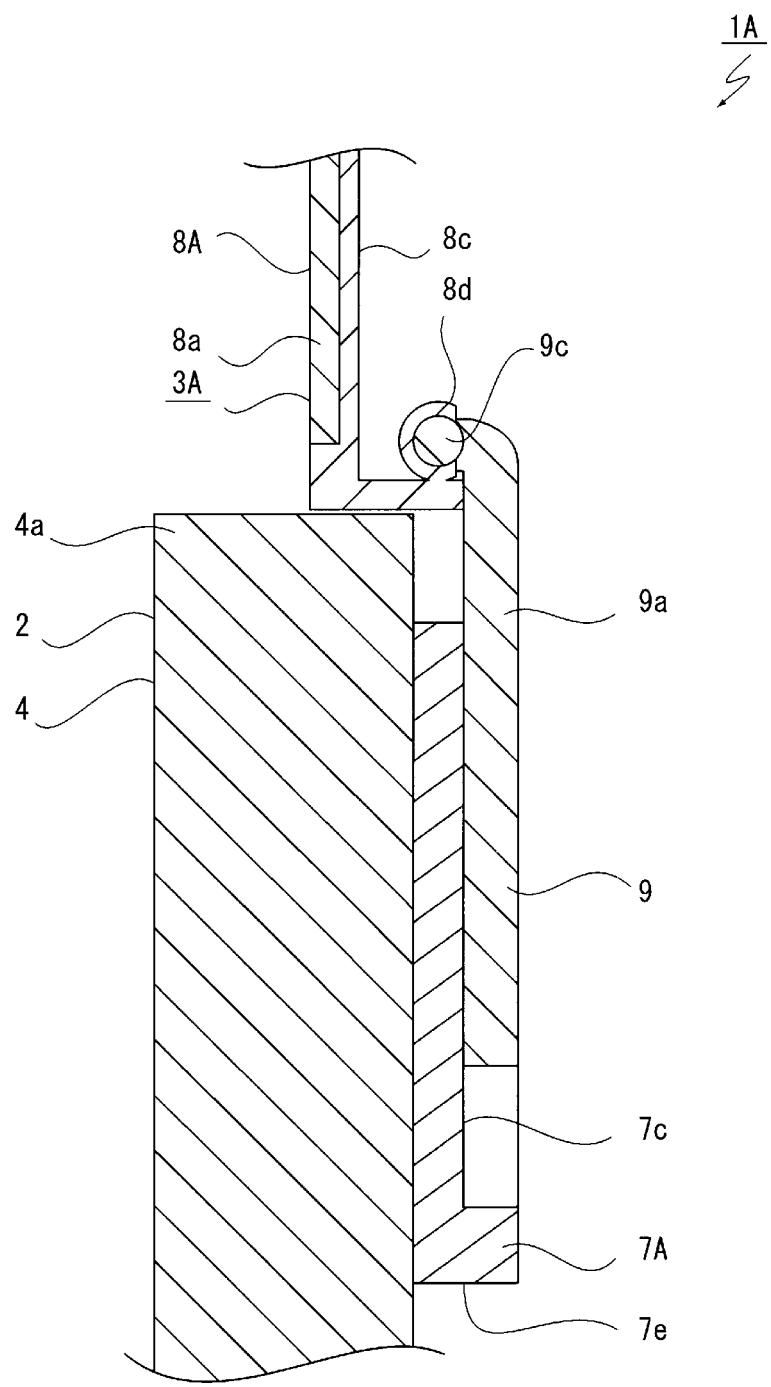
FIG. 20 is an enlarged cross-sectional view showing a status that the display main unit is in an extended position.

When the display main unit 8A is in the first sliding position, the upper end 8x of the display main unit 8A is in contact with the top 4a of the housing 4, whereby the display main unit 8A can be restricted from turning to the base part 7A centering around the second turning axis Y. When the display main unit 8A is slid to the second sliding position, the upper end 8x of the display main unit 8A is no more in contact with the top 4a of the housing 4 and the top 4a of the housing 4 is positioned lower than the axis part 9c. Accordingly, the display main unit 8A turns to the base part 7A accompanied by the turn of the connection part 9 centering around the second turning axis Y, as shown in FIGS. 19 and 20. At this time, the display main unit 8A is in contact with the top 4a of the housing 4, and is restricted from turning at approximately 180 degrees or more centering around the second turning axis Y.

At an outer periphery of the holding unit 5 of the apparatus main body 2 in the image capturing apparatus 1A, the engageable concave part 5b where the right end of the base part 7A is disposed is formed similar to the image capturing apparatus 1 of the first embodiment.

Accordingly, similar to the first embodiment, the display unit 3A is opening and closing to the apparatus main body 2 accompanied by the turn of the holding unit 5 centering around the first turning axis X.

<4. Alternative Embodiment>

In the image capturing apparatus 1 (1A) according to the above-described respective embodiments, the thickness of the housing 4 in the back and forth direction and the thickness (i.e., the diameter) of the holding unit 5 in the back and forth direction are approximately the same.

Figure 21A:
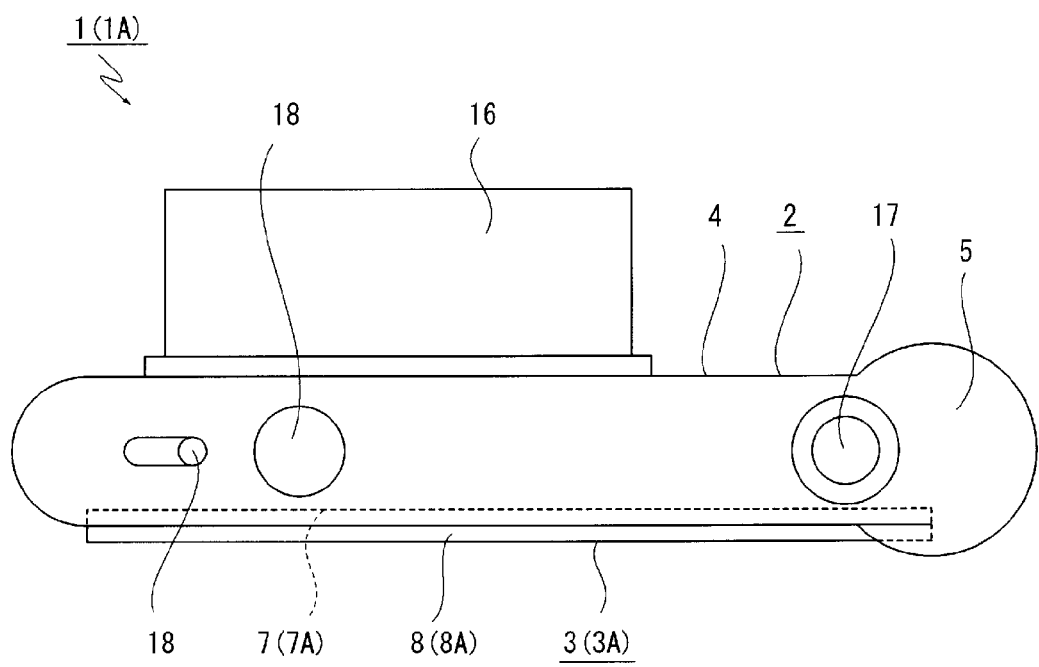
FIGS. 21A and 21B are schematic diagrams showing two examples of the image capturing apparatus having the holding unit thicker than the housing.

Alternatively, the thickness of the holding unit 5 in the back and forth direction may be thicker than the thickness of the housing 4 in the back and forth direction, as shown in FIG. 21A.

Figure 21B:
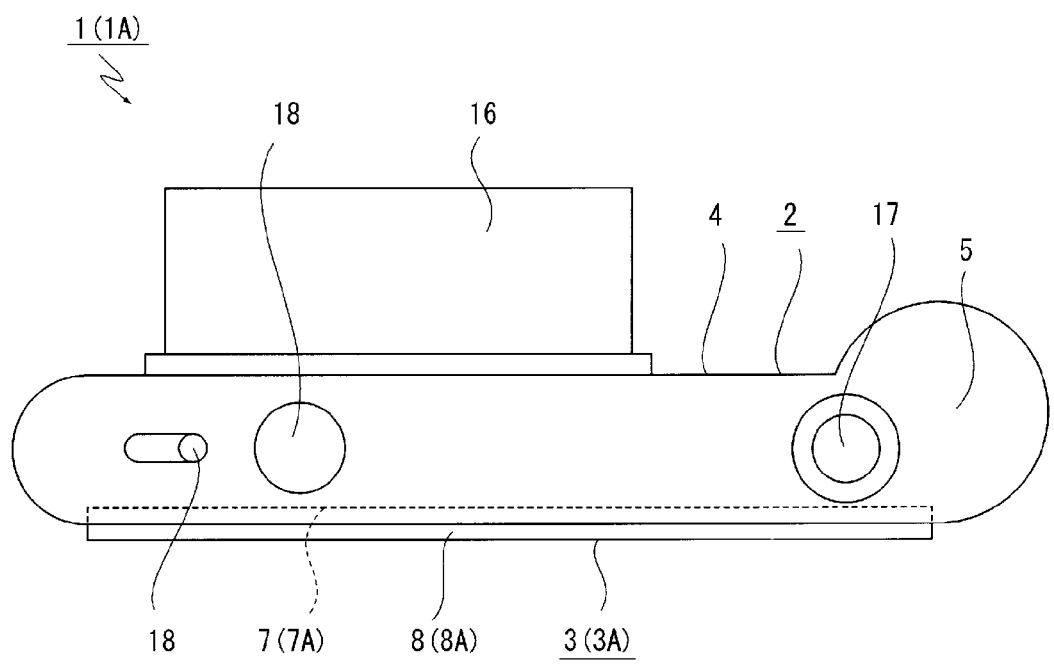

In this manner, the holding unit 5 is well fitted to the palm to assure a good holding status of the holding unit 5 upon the image capture, and ease of use of the image capturing apparatus 1 (1A) can be improved. When the thickness of the holding unit 5 in the back and forth direction is thicker than the thickness of the housing 4 in the back and forth direction, the holding unit 5 bulges only at a front surface of the housing 4 and a rear surface of the holding unit 5 may configure an approximately flat surface in continuously with a rear surface of the housing (see FIG. 21B). In this manner, the holding unit 5 bulges only at a part where the fingers wrap upon the image capture, while ensuring downsizing, a better holding status of the holding unit 5 is assured and ease of use of the image capturing apparatus 1 (1A) can be improved.

In the above-described embodiments, when the display unit 3 (3A) turns to the apparatus main body 2 centering around the first turning axis X, the entire holding unit 5 turns to the housing 4 as an example, but only a part of the holding unit 5 may turn to the housing 4.

For example, the holding unit 5 can be configured of cylindrical or columnar three members having the same diameter and continuously formed in the axial direction of the first turning axis X. The member positioned center is fixed to the housing 4, the two members positioned at an upper end and a lower end can turn to the housing 4, and the display unit 3 (3A) can be connected to the two members positioned up and down.

In this manner, the display unit 3 (3A) can turn to the apparatus main body 2 accompanied by the turn of the two members positioned up and down among the three members of the holding unit 5 to the housing 4.

Accordingly, the display unit 3 can turn centering around the first turning axis X without turning the holding unit 5 held upon the image capture by the image capturing apparatus 1 (1A) as much as possible.

In the above description, the display unit 3 (3A) is detachable to the holding unit 5. Alternatively, the display unit 3 (3A) may be connected to the holding unit 5 and be undetachable from the holding unit 5. In this case, as the auxiliary buttery 11 is unnecessary to be mounted on the display unit 3 (3A), the display unit 3 (3A) and the image capturing apparatus 1 (1A) can be downsized.

In the above description, the display unit 3 (3A) has one display 8a, as an example, but may have a plurality of displays 8a, 8a, . . . . For example, the displays 8a, 8a may be formed on both surfaces of the display main unit 8 (8A).

In this manner, when the display main unit 8 (8A) turns to the apparatus main body 2, the display 8a is visible both from the image capturer side and the object side and the image capturing apparatus with ease of use can be provided.

Figure 22:
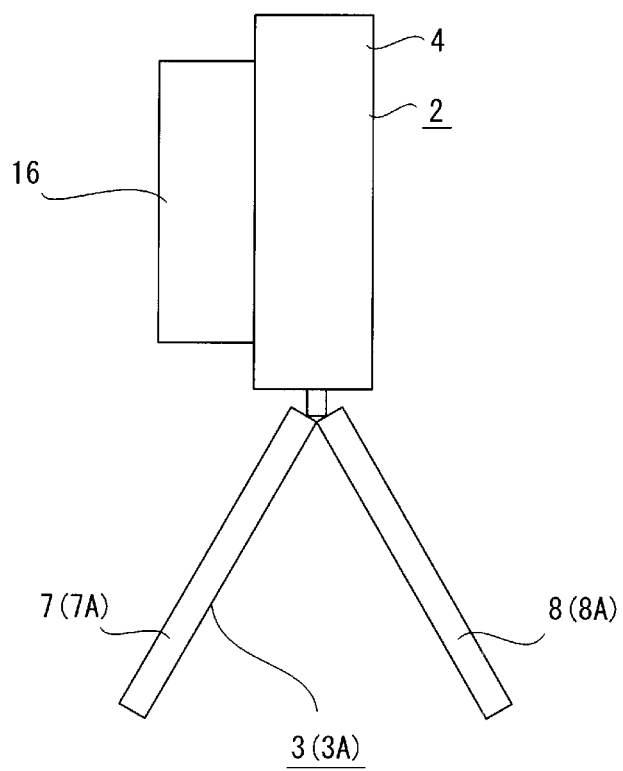
FIG. 22 is a schematic diagram showing that the display unit is used as a tripod stand of the image capturing apparatus.

When the display unit 3 (3A) is detachable from/to the holding unit 5, a manipulandum such as a keyboard may be disposed at one surface of the base part 7 (7A). In this manner, the operability can be improved while mounting a large-sized display 8a. Also, the display unit 3 (3A) detached from the apparatus main body 2 may be used as a tripod stand. For example, as shown in FIG. 22, the display unit 3 (3A) having the base part 7 (7A) and the display main unit 8 (8A) is detached from the apparatus main body 2, the base part 7 (7A) and the display main unit 8 (8A) are open at a suitable angle and mounted on a mounting surface of a table etc. and the apparatus main body 2 may be connected to the display unit 3 (3A).

To connect the apparatus main body 2 to the display unit 3 (3A) a convex part may be disposed at the connection part 9 of the display unit 3 (3A), a concave part fitted into the convex part may be formed on the apparatus main body 2 and the convex part may be connected to the concave part; or concave parts are formed at the connection part 9 and the apparatus main body 2, and a connecting member for connecting the concave parts may be disposed separately.

In this case, the display unit 3 (3A) may have desirably a mechanism to hold the base part 7 (7A) and the display main unit 8 (8A) being open at a suitable angle.

<5. Summary>

As described above, the image capturing apparatus 1 (1A) described in the respective embodiments and alternative embodiments has the holding unit 5 supported freely turnable centering around a first turning axis X and the display unit 3 (3A) is opening and closing to the apparatus main body 2 accompanied by the turn of the holding unit 5. Accordingly, the holding unit 5 also acts as the turning mechanism, no dedicated mechanism for opening and closing the display unit 3 (3A) is necessary, without growing the size of the image capturing apparatus 1 (1A), the display 8a can be enlarged.

In this manner, the visibility to the display unit 3 (3A) is improved when the image is captured and ease of use of the image capturing apparatus 1(1A) can be improved.

In the above-describe image capturing apparatus 1 (1A), the display unit 3 (3A) can turn to the apparatus main body 2 centering around the first turning axis X and centering around the second turning axis Y.

When the selfie is taken under both conditions that the apparatus main body 2 is used being horizontally long and vertically long, the display 8a and the image capturing lens 16a line up and down and face the same direction. Therefore, the image capturing area and the own position are easily perceived and the ease of use can be improved when the image is captured.

When the display unit 3 (3A) is detachable from/to the holding unit, the image displayed on the display 8a can be confirmed at a position distant from the apparatus main body 2.

In this manner, an object person distant from the apparatus main body 2 can confirm an own photograph using the display 8a detached from the apparatus main body 2, thereby providing the image capturing apparatus 1 (1A) having ease of use.

In the configuration that the display unit 3 (3A) is detachable, the image capturing apparatus 1 (1A) may be configured only of the apparatus main body 2. In this case, as the display unit 3 (3A) attached to the image capturing apparatus 1 (1A) composed of the apparatus main body 2, other electronic device such as a mobile phone including a display may be used.

The advantages described in the specification is illustrative and is not limited thereto, and other advantages may be provided.

<Other Embodiments>

Other embodiments of the image capturing apparatus may have the following configurations.

(1) An image capturing apparatus, including:
an apparatus main body having a housing where an image capturing element for converting an optical image of an object into an electrical signal is disposed inside and a holding unit supported by the housing freely turnable centering around a first turning axis orthogonal to an optical axis; and
a display unit having a display on which an image is displayed turning freely opened/closed to the housing centering around the first turning axis.

(2) The image capturing apparatus according to (1) above, in which a storing concave part for storing at least a part of the display unit is formed in the housing.

(3) The image capturing apparatus according to (1) above, in which
the display unit has a base part and a display main unit supported by the base part freely turnable in an axis rotating direction of a second turning axis orthogonal to the first turning axis, and the display main unit turns between a superimposed position where the display main unit is overlaid with the base part and an extended position where the display main unit is adjacent to the base part in an axial direction of the first turning axis.

(4) The image capturing apparatus according to (3) above, in which
the display main unit is slidable to the base part between a first sliding position and a second sliding position in the superimposed position,
turning of the display main unit to the base part is restricted in the first sliding position, and
turning of the display main unit to the base part is possible in the second sliding position.

(5) The image capturing apparatus according to (3) above, in which
a buttery for supplying electrical power to the display main unit is detachable at the base part.

(6) The image capturing apparatus according to (1) above, in which
the display unit includes a terminal and is detachable to the holding unit, and
a connection terminal connecting to the terminal is disposed at the holding unit.

(7) The image capturing apparatus according to (6) above, in which
the display unit has a transmitting part,
the apparatus main body has a receiving part, and
the transmitting part is capable of transmitting a control signal relating to capturing to the receiving part while the display unit is detached from the apparatus main body.

(8) The image capturing apparatus according to (3) above, in which
the display main unit has a touch panel display.

(9) The image capturing apparatus according to (1) above, in which
a thickness of the holding unit in an optical axis direction is thicker than a thickness of the housing in an optical axis direction.

(10) An image capturing apparatus, including:
a housing where an image capturing element for converting an optical image of an object into an electrical signal is disposed inside, and
a holding unit including a connection terminal connecting to a terminal disposed at a display unit having a display on which an image is displayed,
the holding unit being supported by the housing freely turnable around a first turning axis orthogonal to an optical axis.

Present Technology

The present technology may have the following configurations.

(1) An image capturing apparatus, including,
an image capturing device disposed inside of a housing, and a holding unit held by an image capturer upon an image capture,
a first turning axis substantially orthogonal to an optical axis being disposed in the holding unit,
a display unit on which an image captured by the image capturing device is displayed being freely turnable centering around the first turning axis to the housing.

(2) The image capturing apparatus according to (1) above, in which
a lens or lens mount part is disposed at a front surface of the housing, and
a storing space for storing the display unit is disposed at a rear surface positioned opposite to the front surface of the housing.

(3) The image capturing apparatus according to (2) above, in which
a storing concave part for storing at least a part of the display unit is formed in the storing space.

(4) The image capturing apparatus according to any of (1) to (3) above, in which
a lens or lens mount part is disposed at a front surface of the housing, and
the holding unit is positioned at a right side of the lens or the lens mount part when the housing is viewed from backwards by substantially aligning a short direction of the image capturing device with a gravity direction.

(5) The image capturing apparatus according to any of (1) to (4) above, in which
a lens or lens mount part is disposed at a front surface of the housing, and
the holding unit is positioned above of the lens or the lens mount part when the housing is viewed from an opposite direction of the lens or an opposite direction of the lens mount part by substantially aligning a longitudinal direction of the image capturing device with a gravity direction.
(6) The image capturing apparatus according to (5) above, in which
an image capturing button is positioned at a right end or a left end of an upper end of the housing.
(7) The image capturing apparatus according to any of (1) to (6) above, in which
the first turning axis is substantially aligned with the short direction of the image capturing device.
(8) The image capturing apparatus according to any of (1) to (7) above, in which
the display unit has a base part connected to the housing unit and a display main unit supported by the base part freely turnable in an axis rotating direction of a second turning axis orthogonal to the first turning axis, and
the display main unit turns between a superimposed position where the display main unit is overlaid with the base part and an extended position where the display main unit is adjacent to the base part in an axial direction of the first turning axis.
(9) The image capturing apparatus according to (8) above, in which
the display main unit is slidable to the base part between a first sliding position and a second sliding position in the superimposed position,
turning of the display main unit to the base part is restricted in the first sliding position, and
turning of the display main unit to the base part is possible in the second sliding position.
(10) The image capturing apparatus according to (8) or (9) above, in which
a buttery for supplying electrical power to the display main unit is detachable at the base part.
(11) The image capturing apparatus according to any of (1) to (10) above, in which
the holding unit centering around the first turning axis turns by opening and closing the display unit.
(12) The image capturing apparatus according to (11) above, in which
the display unit is detachable to the holding unit, and
a connection terminal transmitting an image signal of the image capturing device to the display unit is disposed.
(13) The image capturing apparatus according to (12) above, in which
the display unit has a transmitting part,
the housing has a receiving part, and
the transmitting part is capable of transmitting a control signal relating to capturing to the receiving part while the display unit is detached from the holding unit.
(14) The image capturing apparatus according to any of (8) to (13) above, in which
the display main unit has a touch panel display.
(15) The image capturing apparatus according to any of (1) to (14) above, in which
a thickness of the holding unit in an optical axis direction is thicker than a thickness of the housing in an optical axis direction.
(16) The image capturing apparatus according to any of (1) to (15) above, in which
a lens or lens mount part is disposed at a front surface of the housing,
the holding unit bulges only at the front surface of the housing.
(17) The image capturing apparatus according to any of (1) to (16) above, in which
the holding unit has a cylindrical shape centering around the first turning axis.
(18) An image capturing apparatus, including:
an image capturing device disposed inside of a housing,
a holding unit held by an image capturer upon an image capture, and
a display unit on which an image captured by the image capturing device is displayed,
a first turning axis substantially orthogonal to an optical axis being disposed in the holding unit, and
the display unit freely opened/closed to the housing centering around the first turning axis.

It should be understood by those skilled in the art that various modifications, combinations, sub-combinations and alterations may occur depending on design requirements and other factors insofar as they are within the scope of the appended claims or the equivalents thereof.

What is claimed is:

1. An image capturing apparatus, comprising:
a housing;
an image capturing device configured to be disposed inside the housing; and
a holding unit held by an image capturer upon an image capture,
a first turning axis, substantially orthogonal to an optical axis, disposed in the holding unit,
a display unit configured to display the image captured by the image capturing device and configured to be turned freely opened/closed to the housing centered around the first turning axis,
wherein the housing includes at least two protruded edges extended in a direction orthogonal to the first turning axis and the optical axis.

2. The image capturing apparatus according to claim 1, further comprising:
a lens or lens mount part configured to be disposed at a front surface of the housing, and
a storing space, which is configured to store the display unit, is configured to be disposed at a rear surface positioned opposite to the front surface of the housing.

3. The image capturing apparatus according to claim 2, further comprising:
a storing concave part, which is configured to store at least a part of the display unit, in the storing space.

4. The image capturing apparatus according to claim 1, further comprising:
a lens or lens mount part configured to be disposed at a front surface of the housing, and
the holding unit is configured to be positioned at a right side of the lens or the lens mount part in an event the housing is viewed from backwards by substantial alignment of a short direction of the image capturing device with a gravity direction.

5. The image capturing apparatus according to claim 1, further comprising:
a lens or lens mount part configured to be disposed at a front surface of the housing, and
the holding unit is positioned above of the lens or the lens mount part in an event the housing is viewed from an opposite direction of the lens or an opposite direction of the lens mount part by substantial alignment of a longitudinal direction of the image capturing device with a gravity direction.

6. The image capturing apparatus according to claim 5, further comprising:
an image capturing button configured to be positioned at a right end or a left end of an upper end of the housing.

7. The image capturing apparatus according to claim 1, wherein
the first turning axis is substantially aligned with the short direction of the image capturing device.

8. The image capturing apparatus according to claim 1, wherein
the holding unit is configured to be turned centering around the first turning axis based on a determination that the display unit is opened and closed.

9. The image capturing apparatus according to claim 8, wherein
the display unit is configured to be detached to the holding unit, and
a connection terminal is configured to transmit an image signal of the image capturing device to the display unit is disposed.

10. The image capturing apparatus according to claim 9, wherein
the display unit has a transmitting part,
the housing has a receiving part, and
the transmitting part is configured to transmit a control signal to the receiving part while the display unit is detached from the holding unit.

11. The image capturing apparatus according to claim 1, wherein
a thickness of the holding unit in an optical axis direction is thicker than a thickness of the housing in the optical axis direction.

12. The image capturing apparatus according to claim 1, further comprising:
a lens or lens mount part configured to be disposed at a front surface of the housing, wherein
the holding unit is configured to be bulged only at the front surface of the housing.

13. The image capturing apparatus according to claim 1, wherein
the holding unit has a cylindrical shape centered around the first turning axis.

14. The image capturing apparatus according to claim 1, wherein each of the at least two protruded edges includes one or more columnar convex parts.

15. The image capturing apparatus according to claim 14, wherein the holding unit includes one or more concave parts into which the one or more columnar convex parts of the housing are inserted.

16. An image capturing apparatus, comprising:
a housing;
an image capturing device configured to be disposed inside the housing; and
a holding unit held by an image capturer upon an image capture,
a first turning axis, substantially orthogonal to an optical axis, disposed in the holding unit,
a display unit configured to display the image captured by the image capturing device and configured to be turned freely opened/closed to the housing centered around the first turning axis,
wherein, the display unit has a base part configured to be connected to the holding unit and a display main unit configured to be supported by the base part freely turnable in an axis rotating direction of a second turning axis orthogonal to the first turning axis, and
the display main unit configured to be turned between a superimposed position at which the display main unit is configured to be overlaid with the base part and an extended position at which the display main unit is adjacent to the base part in an axial direction of the first turning axis.

17. The image capturing apparatus according to claim 16, wherein
the display main unit is configured to be slid to the base part between a first sliding position and a second sliding position in the superimposed position,
display main unit is restricted to be turned to the base part in the first sliding position, and
display main unit is allowed to be turned to the base part in the second sliding position.

18. The image capturing apparatus according to claim 16, further comprising:
a battery, configured to supply electrical power to the display main unit, is configured to be detached at the base part.

19. The image capturing apparatus according to claim 16, wherein
the display main unit has a touch panel display.

20. An image capturing apparatus, comprising:
a housing,
an image capturing device configured to be disposed inside the housing,
a holding unit held by an image capturer upon an image capture, and
a display unit,
a first turning axis, substantially orthogonal to an optical axis, disposed in the holding unit,
the display unit is configured to be freely opened/closed to the housing centered around the first turning axis, and
the housing includes at least two protruded edges extended in a direction orthogonal to the first turning axis and the optical axis.

21. The image capturing apparatus according to claim 20, further comprising:
an engageable concave part on an outer periphery of the holding unit,
wherein the engageable concave part is configured to be extended to an up and down direction orthogonal to an optical axis direction.

22. The image capturing apparatus according to claim 21, wherein the engageable concave part includes a connecting terminal which is configured to connect with a terminal of the display unit.

\* \* \* \* \*